US012188494B2

(12) United States Patent
Wang et al.

(10) Patent No.: US 12,188,494 B2
(45) Date of Patent: *Jan. 7, 2025

(54) DUAL POWER ELECTRO-HYDRAULIC MOTION CONTROL SYSTEM

(71) Applicant: DANFOSS A/S, Nordborg (DK)

(72) Inventors: Meng Wang, Eden Prairie, MN (US); Jalpa Shah, Woodbury, MN (US); Damrongrit Piyabongkarn, Medina, MN (US)

(73) Assignee: DANFOSS A/S, Nordborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,286

(22) Filed: Aug. 8, 2022

(65) Prior Publication Data

US 2023/0046319 A1 Feb. 16, 2023

Related U.S. Application Data

(63) Continuation of application No. 16/459,134, filed on Jul. 1, 2019, now Pat. No. 11,408,445.

(Continued)

(51) Int. Cl.

*F15B 21/14* (2006.01)
*F15B 11/17* (2006.01)

(52) U.S. Cl.

CPC ............... *F15B 11/17* (2013.01); *F15B 21/14* (2013.01); *F15B 2211/20515* (2013.01); *F15B 2211/20561* (2013.01); *F15B 2211/20569* (2013.01); *F15B 2211/212* (2013.01); *F15B 2211/27* (2013.01); *F15B 2211/30525* (2013.01); *F15B 2211/6658* (2013.01); *F15B 2211/7053* (2013.01); *F15B 2211/761* (2013.01); *F15B 2211/88* (2013.01)

(58) Field of Classification Search

None

See application file for complete search history.

(56) References Cited

U.S. PATENT DOCUMENTS 5,020,618 A 6/1991 Nagao
5,329,766 A 7/1994 Yamaguchi et al.

(Continued)

FOREIGN PATENT DOCUMENTS

AU 2002230015 C1 6/2002
CN 1653271 A 8/2005

(Continued)

OTHER PUBLICATIONS

Extended European Search Report for Application No. 19185886.9 mailed Sep. 30, 2019.

(Continued)

*Primary Examiner* — Kenneth Bomberg
*Assistant Examiner* — Michael Quandt
(74) *Attorney, Agent, or Firm* — Merchant & Gould P.C.

(57) ABSTRACT

A motion control unit capable of receiving electrical power from an electrical power source and hydraulic power from a hydraulic power source. The motion control is configured to produce a blended power output derived from the electrical and hydraulic power which can be used to power a hydraulic actuator. The motion control unit can also split hydraulic power recovered from hydraulic actuator to the electrical power source and the hydraulic power source.

5 Claims, 16 Drawing Sheets

Related U.S. Application Data

(60) Provisional application No. 62/697,226, filed on Jul. 12, 2018.

(56) References Cited

U.S. PATENT DOCUMENTS

| | | | |
|---|---|---|---|
| 6,739,127 B2 | 5/2004 | Nippert et al. | |
| 8,108,111 B2 * | 1/2012 | Stein | F16H 61/4096 180/367 |
| 8,186,154 B2 | 5/2012 | Nelson et al. | |
| 8,479,604 B2 | 7/2013 | Jackson | |
| 9,057,389 B2 | 6/2015 | Opdenbosch | |
| 9,512,596 B2 | 12/2016 | Kang et al. | |
| 9,765,501 B2 | 9/2017 | Wang et al. | |
| 9,845,813 B2 | 12/2017 | Shimizu et al. | |
| 10,100,827 B2 | 10/2018 | Devan et al. | |
| 10,273,657 B2 | 4/2019 | Quan et al. | |
| 10,746,293 B2 * | 8/2020 | Shimada | F16H 61/4096 |
| 11,104,234 B2 | 8/2021 | Wang et al. | |
| 11,408,445 B2 | 8/2022 | Wang et al. | |
| 11,697,349 B2 | 7/2023 | Wang et al. | |
| 2004/0060430 A1 | 4/2004 | Brinkman | |
| 2005/0246082 A1 | 11/2005 | Miki et al. | |
| 2006/0061213 A1 | 3/2006 | Michalko | |
| 2007/0166168 A1 | 7/2007 | Vigholm et al. | |
| 2007/0227801 A1 | 10/2007 | Loeffler | |
| 2009/0036264 A1 | 2/2009 | Tozawa et al. | |
| 2009/0100830 A1 | 4/2009 | Schneider et al. | |
| 2010/0107620 A1 | 5/2010 | Nelson et al. | |
| 2011/0056194 A1 | 3/2011 | Wojcicki et al. | |
| 2012/0089280 A1 | 4/2012 | Onsager et al. | |
| 2013/0014499 A1 | 1/2013 | Gray, Jr. | |
| 2013/0125536 A1 | 5/2013 | Ho et al. | |
| 2015/0101322 A1 | 4/2015 | Riskas | |
| 2016/0152138 A1 | 6/2016 | McCann | |
| 2016/0281745 A1 | 9/2016 | Shang et al. | |
| 2016/0333903 A1 | 11/2016 | Peterson et al. | |
| 2017/0121942 A1 | 5/2017 | Danzl et al. | |
| 2017/0130739 A1 | 5/2017 | Zhang et al. | |
| 2018/0128292 A1 | 5/2018 | Wang et al. | |
| 2019/0199098 A1 | 6/2019 | Shah et al. | |
| 2019/0296541 A1 | 9/2019 | Mensch et al. | |
| 2020/0016987 A1 | 1/2020 | Wang et al. | |

FOREIGN PATENT DOCUMENTS

| | | | |
|---|---|---|---|
| CN | 1690451 | A | 11/2005 |
| CN | 101120142 | A | 2/2008 |
| CN | 104203799 | A | 12/2014 |
| CN | 104328817 | A | 2/2015 |
| CN | 108055856 | A | 5/2018 |
| EP | 2660395 | A1 | 11/2013 |
| EP | 3 159 549 | A1 | 4/2017 |
| JP | 51-73677 | A | 6/1976 |
| JP | 2004-197901 | A | 7/2004 |
| JP | 2005-83242 | A | 3/2005 |
| JP | 2005076781 | A | 3/2005 |
| JP | 2006-258368 | A | 9/2006 |
| JP | 2014-1793 | A | 1/2014 |
| JP | 2014-51252 | A | 3/2014 |
| JP | 2015-120515 | A | 7/2015 |
| WO | 2018028944 | A1 | 2/2018 |

OTHER PUBLICATIONS

Extended European Search Report for Application No. 19185616.0 mailed Dec. 16, 2019.

JP 2005076781 A; machine translation to English from esp@cenet (Year: 2005).

He et al., "Research on Hydraulic Excavator Potential Energy Regeneration System," Journal of Guizhou University (Natural Sciences), vol. 34, No. 6, 10 pages including Machine English Translation (Dec. 2017).

Lee et al., "Modeling and Control of Plug-In Hybrid Excavator," 39th Annual Conference of the IEEE Industrial Electronics Society, pp. 4653-4659, DOI: 10.1109/IECON.2013.6699886 (2013).

Zhang et al., "Simulation and Experimental Research on Energy Regeneration with Hydraulic Motor for Hybrid Drive Excavator," Chinese Journal of Mechnical Engineering, vol. 43, No. 8, 14 pages including Machine English Translation (Aug. 2007).

* cited by examiner

DUAL POWER ELECTRO-HYDRAULIC MOTION CONTROL SYSTEM

CROSS REFERENCE TO RELATED APPLICATION

This application is a continuation of U.S. patent application Ser. No. 16/459,134, filed Jul. 1, 2019, now U.S. Pat. No. 11,408,445; which claims the benefit of U.S. Provisional Patent Application No. 62/697,226, filed Jul. 12, 2018, which application is hereby incorporated by reference in its entirety.

TECHNICAL FIELD

The present disclosure relates generally to motion control systems for controlling movement of actuators such as hydraulic cylinders.

BACKGROUND

In recent years, more energy efficient solutions have been explored for powering off-road vehicles. One example proposed solution involves integrating an electric motor into the propel circuit for driving an off-road vehicle so that braking energy can be more easily recaptured. Another proposed solution involves using an electric motor to power the swing service on large excavators so that swing braking energy can be recaptured. Both of these proposed solutions can have relatively large payback times (e.g., greater than 8 years) based on fuel savings calculations, and have not been widely accepted in the marketplace. Thus, the current state-of-the-art technology has not provided a cost effective and widely accepted solution to increasing the operating efficiency of off-road vehicles.

SUMMARY

Aspects of the present disclosure relate to a dual power electro-hydraulic motion control unit. In certain examples, the dual power electro-hydraulic motion control unit can be used for hydraulic mobile applications such as for off-road vehicles. In certain examples, the dual power electro-hydraulic motion control unit enables power blending between electrical power and hydraulic power. In certain examples, the combined power is delivered to an actuator's working port (e.g., the working port of a linear actuator such as a hydraulic cylinder or a rotary actuator such as a hydraulic pump or motor) in a controlled manner. In certain examples, the electro-hydraulic motion control unit is effective at controlling motion of an actuator in both over-running conditions and in passive conditions. In certain examples, the electro-hydraulic motion control unit can deliver energy from: a) an electrical power source; b) hydraulic power source; and c) both the hydraulic power source and the electrical power source. In certain examples, over-running energy from the actuator can be regenerated into: a) hydraulic energy; b) electrical energy; or c) both electrical and hydraulic energy. In certain examples, the hydraulic energy source can function to provide high power density for providing a baseline level of power, and the electrical power source can provide power control flexibility, precision and bandwidth. In certain examples, a dual powered electro-hydraulic motion control unit in accordance with the principles of the present disclosure can reduce or eliminate throttling losses compared with conventional control approaches. In certain examples, dual power electro-hydraulic motion control units in accordance with the principles of the present disclosure can utilize less complex hydraulic controllers by relying upon electrical power to provide control flexibility and precision. In certain examples, dual power electro-hydraulic motion control units in accordance with the principles of the present disclosure satisfy power requirements greater than 50 horsepower, or in the range of 50-100 horsepower.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
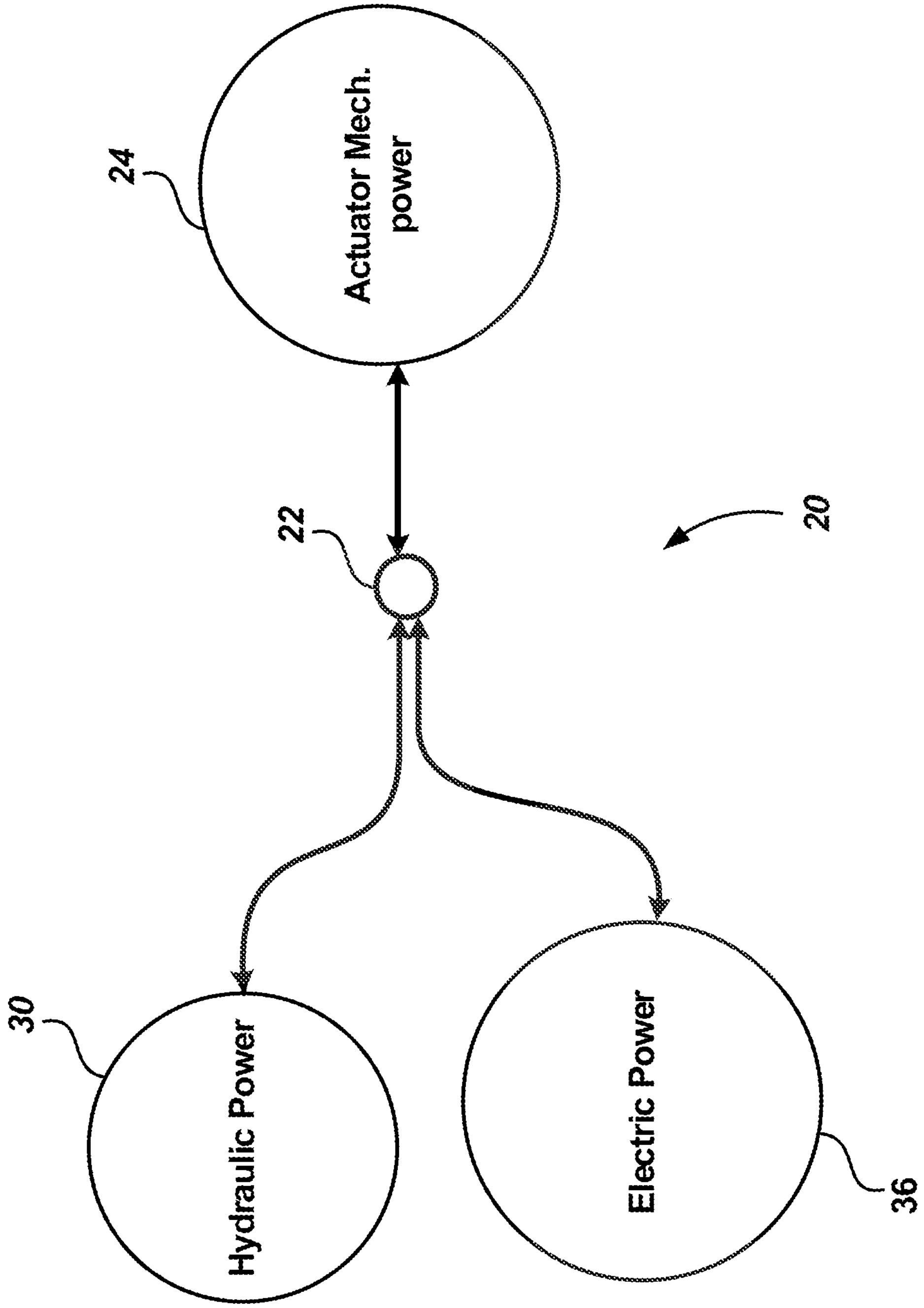
FIG. 1 schematically depicts a dual power electro-hydraulic motion control unit in accordance with the principles of the present disclosure for powering an actuator.

FIG. 1 is a high-level schematic depicting a dual power electro-hydraulic actuation system 20 in accordance with the principles of the present disclosure. The dual power electro-hydraulic actuation system 20 includes a dual power electro-hydraulic motion control unit 22 that is hydraulically coupled to a hydraulic actuator 24. The hydraulic actuator 24 is configured for converting hydraulic power into mechanical power. Example hydraulic actuators 24 include linear actuators such as hydraulic cylinders and rotary actuators such as hydraulic motors. The dual power electro-hydraulic motion control unit 22 can receive power from and transfer power to a hydraulic power source 30 (e.g., a hydraulic power source having a hydraulic pressure higher than tank pressure; the hydraulic pressure source may include a hydraulic accumulator and/or a hydraulic pump and/or a common pressure rail (CPR), or the like). The dual power electro-hydraulic motion control unit 22 can also receive power from and transfer power to an electrical power source 36 such as an electrical power line (e.g., an electrical power bus such as a direct current (DC) bus coupled to an electrical generator, battery, capacitor or the like). It will be appreciated that energy/power can be transferred bi-directionally between the hydraulic actuator 24 and the dual power electro-hydraulic motion control unit 22. For example, power can be transferred from the dual power electro-hydraulic motion control unit 22 to the hydraulic actuator 24 to drive movement of the hydraulic actuator 24 under passive operating conditions, and can be transferred to the dual power electro-hydraulic motion control unit 22 from the hydraulic actuator 24 under over-running operating conditions. In certain examples, the power transferred from the dual power electro-hydraulic motion control unit 22 to the hydraulic actuator 24 can be derived from: a) the hydraulic power source 30; b) the electrical power source 36; or c) a blending of power between the hydraulic power source 30 and the electrical power source 36. The blending of power allows for individual component size reduction within the dual power electro-hydraulic motion control unit 22, and the ability to provide a relatively high power density while concurrently providing relatively precise control of the power output from the dual power electro-hydraulic motion control unit 22. In certain examples, the power transferred to the dual power electro-hydraulic motion control unit 22 from the hydraulic actuator 24 can be captured at or transferred to: a) the hydraulic power source 30; b) the electrical power source 36; or c) both the hydraulic power source 30 and the electrical power source 36.

Figure 2:
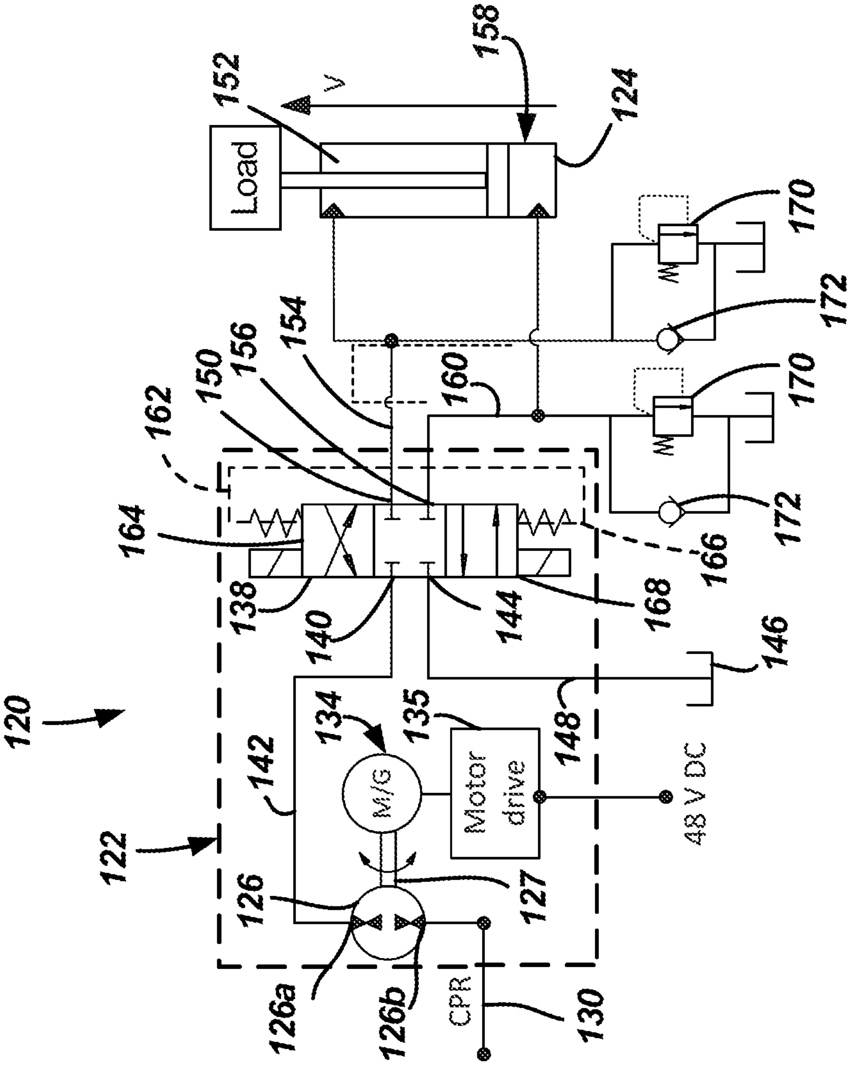
FIG. 2 depicts a first example of a dual power electro-hydraulic motion control unit in accordance with the principles of the present disclosure.

FIG. 2 shows a first dual power electro-hydraulic actuator system 120 in accordance with the principles of the present disclosure. The dual power electro-hydraulic actuator system 120 includes a dual power electro-hydraulic motion control unit 122 shown hydraulically coupled to a hydraulic actuator depicted as a hydraulic cylinder 124. The dual power electro-hydraulic motion control unit 122 includes a hydraulic pump/motor 126 (e.g., a bi-directional pump/motor) having a first hydraulic port **126*a* and a second hydraulic port 126*b*. The first port 126*a* is adapted to selectively be placed in fluid communication with a load holding side of the hydraulic cylinder 124 by a valve 138. The second hydraulic port 126*b* is fluidly connected or coupled to (i.e., in fluid communication with) a hydraulic power source depicted as a common pressure rail 130 (CPR). The common pressure rail 130 can be pressurized by a hydraulic pump or the like and can include a hydraulic accumulator for storing and/or supplying hydraulic pressure as needed. The dual power electro-hydraulic motion control unit 122 also includes an electric motor/generator 134 which is electrically coupled to an electrical power source 136 (see FIG. 5). The electric motor/generator 134 is also coupled to the hydraulic pump/motor 126 by a drive shaft 127. In one example, the motor/generator 134 is a servo electric motor/generator. The electric motor/generator 134 includes a motor drive 135 coupled to the electrical power source 136. The electrical power source 136 is depicted as an electrical conductor such as an electrical bus which is preferably energized by an electrical generator or the like and may include one or more batteries or capacitors for storing and/or supplying electrical energy as needed. As depicted, the electrical power source 136** is a 48 volt direct current (DC) bus.

In certain examples, the DC bus is electrically connected to a plurality of dual power electro-hydraulic motion control units to allow for electrical power sharing and power exchanging between the different motion control units so as to enhance power management. This type of power management can assist in reducing the number of batteries required for electrical energy storage. The battery size/electrical energy storage requirements for the overall system can also be reduced since re-captured energy from a first control unit (e.g., a control unit coupled to an over-running actuator) can be used in real-time by a second control unit (e.g., a control unit passively driving an actuator) rather than being stored. In certain examples, a plurality of dual power electro-hydraulic motion control units are connected to the common pressure rail 130 to allow for hydraulic power exchange between the different dual power electro-hydraulic motor control units. Thus, separate accumulators and separate pumps are not required for each individual dual power electro-hydraulic motion control unit. Additionally, in certain conditions, recaptured energy from one of the dual power electro-hydraulic motion control units that is coupled to an overrunning actuator can be used immediately by another of the dual power electro-hydraulic motion control units that is passively driving its corresponding actuator. This type of power management can reduce the required hydraulic energy storage capacity of the overall system.

Referring again to FIG. 2, the dual power electro-hydraulic motion control unit 122 includes the valve 138 which is configured for controlling fluid communication between the dual power electro-hydraulic motion control unit 122 and the hydraulic cylinder 124. As depicted at FIG. 2, the valve 138 includes a three position spool valve. In other examples, a plurality of separate valves can be used. It will be appreciated that the valve 138 can be moved between its different positions by an actuator such as a solenoid or a voice coil actuator, and/or can have movement which is spring and/or pilot assisted. The valve 138 includes a pump port 140 fluidly connected to the first hydraulic port 126*a* by hydraulic fluid line 142. The valve 138 also includes a tank port 144 fluidly connected to tank 146 by hydraulic fluid line 148. The valve 138 further includes a first actuator port 150 fluidly connected to a rod side 152 of the hydraulic cylinder 124 by hydraulic fluid line 154, and a second actuator port 156 in fluidly connected with a head side 158 of the hydraulic cylinder 124 by hydraulic fluid line 160.

The dual power electro-hydraulic motion control unit 122 can further include a first pilot line 162 in fluid communication with the hydraulic fluid line 154 that acts on a first end 164 of the valve 138 and a second pilot line 166 in fluid communication with the hydraulic line 160 that acts on a second end 168 of the valve 138. The pilot lines 162, 166 can be configured to move the valve 138 to place the pump port 140 in fluid communication with the load holding side of the hydraulic cylinder 124 (i.e., the side of the hydraulic cylinder 124 having the higher pressure).

The dual power electro-hydraulic motion control unit 122 can further include pressure relief valves 170 for preventing the hydraulic pressure at the rod side 152 and the head side 158 of the hydraulic cylinder 124 from exceeding a predetermined level. Additionally, the dual power electro-hydraulic motion control unit 122 can include one-way check valves 172 for preventing cavitation from occurring at the rod side 152 or the head side 158 of the hydraulic cylinder 124.

Figure 3:
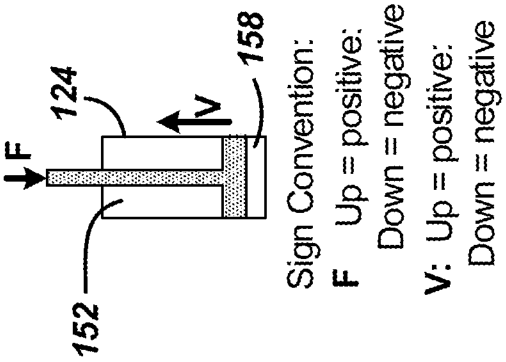
FIG. 3 depicts an actuator of the type powered by the dual power electro-hydraulic motion control unit of FIG. 2 with depicted sign conventions for velocity and force.

FIG. 3 schematically shows the hydraulic cylinder 124 and indicates different sign conventions for the hydraulic cylinder 124. Referring to FIG. 3, the arrow labeled F represents the direction that load is being applied to the rod of the hydraulic cylinder 124. When the arrow F is directed in an upward direction, the load corresponds to a positive force value. When the arrow F is directed in a downward direction, the load corresponds to a negative force value. Still referring to FIG. 3, the arrow labeled V represents the direction of movement of the piston rod of the hydraulic cylinder 24 relative to the cylinder body of the hydraulic cylinder 124. An upward direction of the velocity arrow represents a positive direction while a downward direction of the velocity arrow represents a negative direction.

Figure 4:
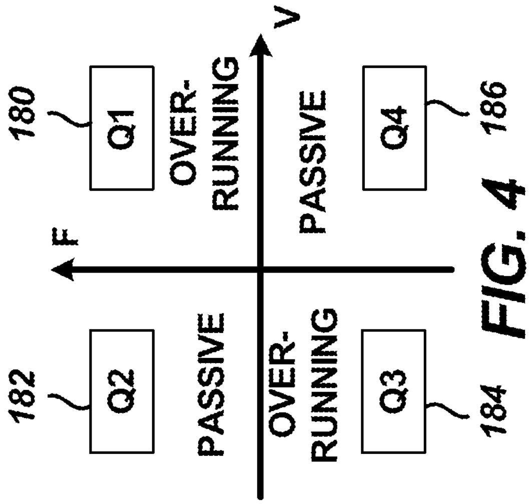
FIG. 4 schematically depicts four quadrants of operations for the dual power electro-hydraulic motion control unit of FIG. 2.

It is preferred for the dual power electro-hydraulic motion control unit 122 to support four-quadrant operation of the hydraulic cylinder 124. Transitioning between the various quadrants of operation is preferably handled by supervisory control. FIG. 4 illustrates the four different quadrants of operation that are allowed by the dual power electro-hydraulic motion control unit 122. A first quadrant 180 of FIG. 4 represents an operational condition in which the velocity V of the piston rod and the load force F acting on the piston rod are both in a positive direction. This represents an over-running condition in which the hydraulic cylinder is extending and the rod side 152 of the hydraulic cylinder 124 is the load holding side of the hydraulic cylinder 124. When the dual power electro-hydraulic motion control unit 122 is operating in the first quadrant 180, energy from the load is directed from the hydraulic cylinder 124 back to the dual power electro-hydraulic motion control unit 122 where the energy is captured for re-use. The second quadrant 182 represents a condition in which the load force F acting on the piston rod of the hydraulic cylinder 124 is positive and the velocity of the piston rod is negative. The second quadrant 182 is a passive operating condition in which the hydraulic cylinder is retracting and the rod side 152 of the hydraulic cylinder 124 is the load-holding side of the hydraulic cylinder 124. In this condition, hydraulic energy is directed from the dual power electro-hydraulic motion control unit 122 to the hydraulic cylinder 124 to drive movement of the load. FIG. 4 also shows a third quadrant 184 which represents an operating condition in which both the load force F and the velocity V are negative. This represents an over-running condition in which the hydraulic cylinder is retracting and the head side of the hydraulic cylinder 124 is the load holding side of the hydraulic cylinder 124. In this condition, hydraulic pressure within the head side of the hydraulic cylinder 124 resists and controls movement of the piston rod caused by the force F. In the over-running condition corresponding to the third quadrant 184, energy is transferred from the hydraulic cylinder 124 back to the dual power electro-hydraulic motor control unit 122 for re-use. A fourth quadrant 186 of FIG. 4 is representative of an operating condition in which the force F acting on the piston rod of the hydraulic cylinder 124 is negative and the direction of movement V of the piston rod is positive. In this operating condition, the head side of the hydraulic cylinder 124 is the load holding side. This represents a passive operating condition in which the hydraulic cylinder 124 is extended and hydraulic energy from the dual power electro-hydraulic motor control unit 122 is used to drive movement of the piston rod in a direction opposite to the load F applied to the piston rod.

Figure 5:
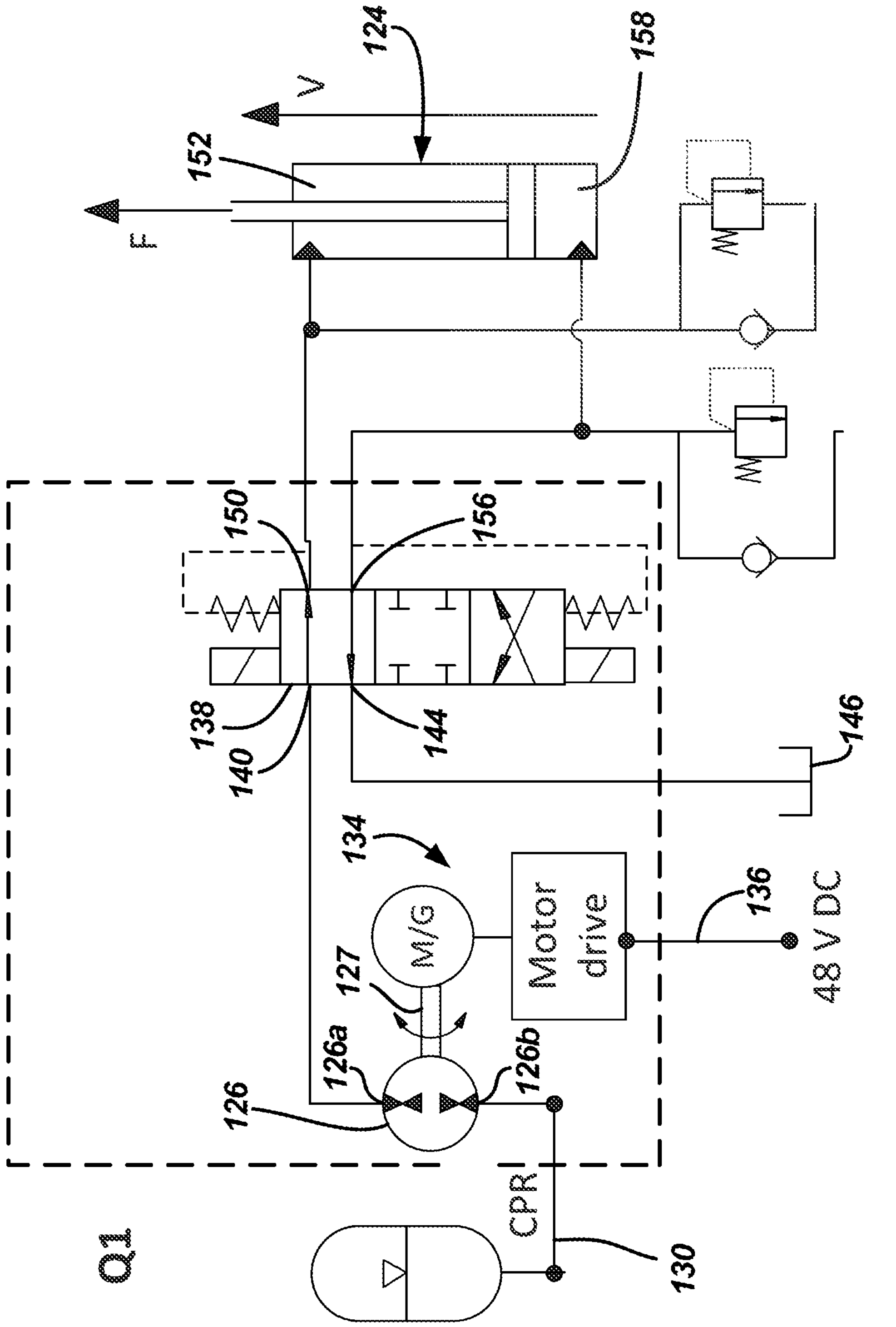
FIG. 5 illustrates the electro-hydraulic motion control unit of FIG. 2 operating in a first over-running operating condition corresponding to first quadrant operation.
Figure 6:
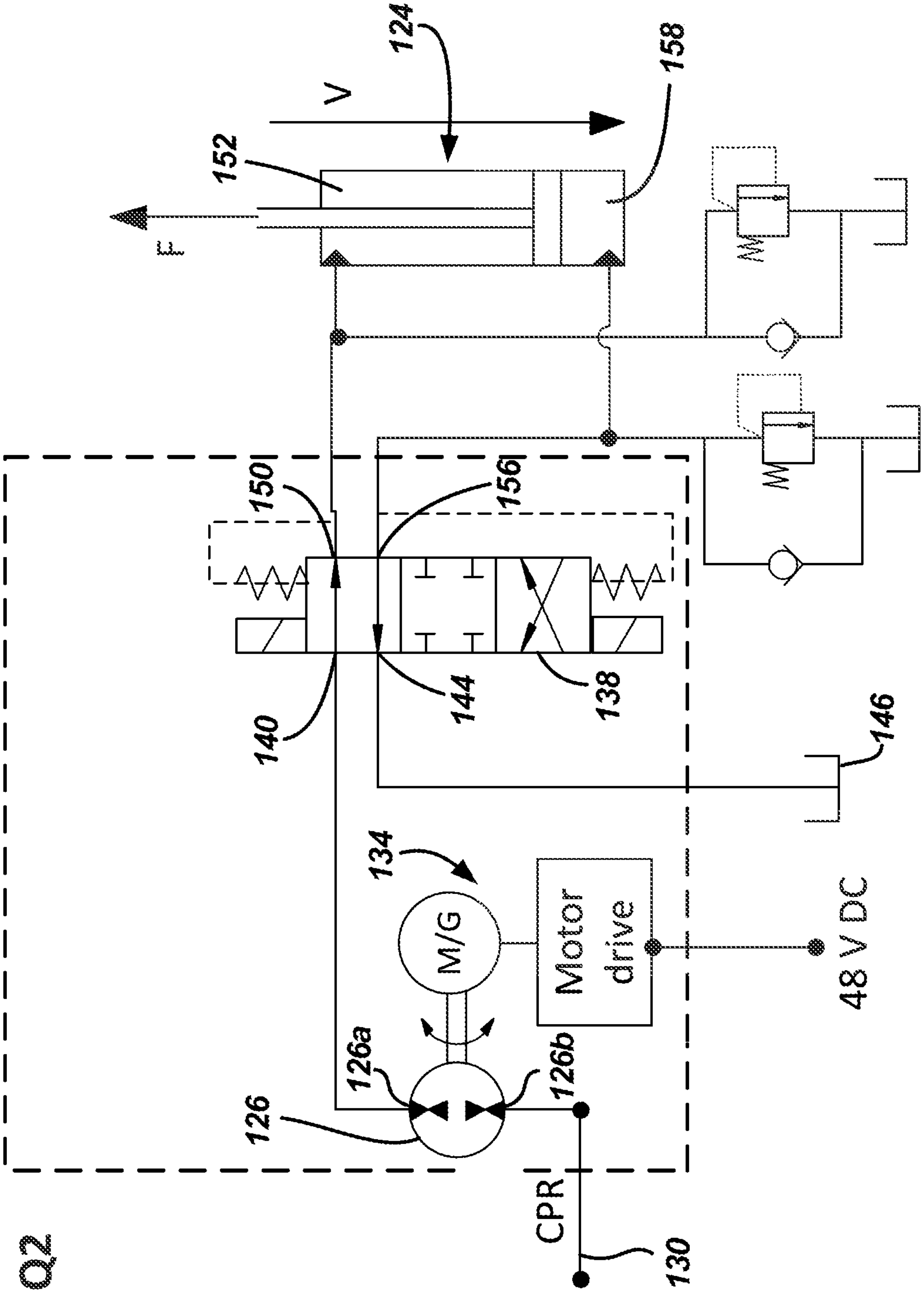
FIG. 6 depicts the dual power electro-hydraulic motion control unit of FIG. 2 operating in a first passive operating condition corresponding to second quadrant operation.
Figure 7:
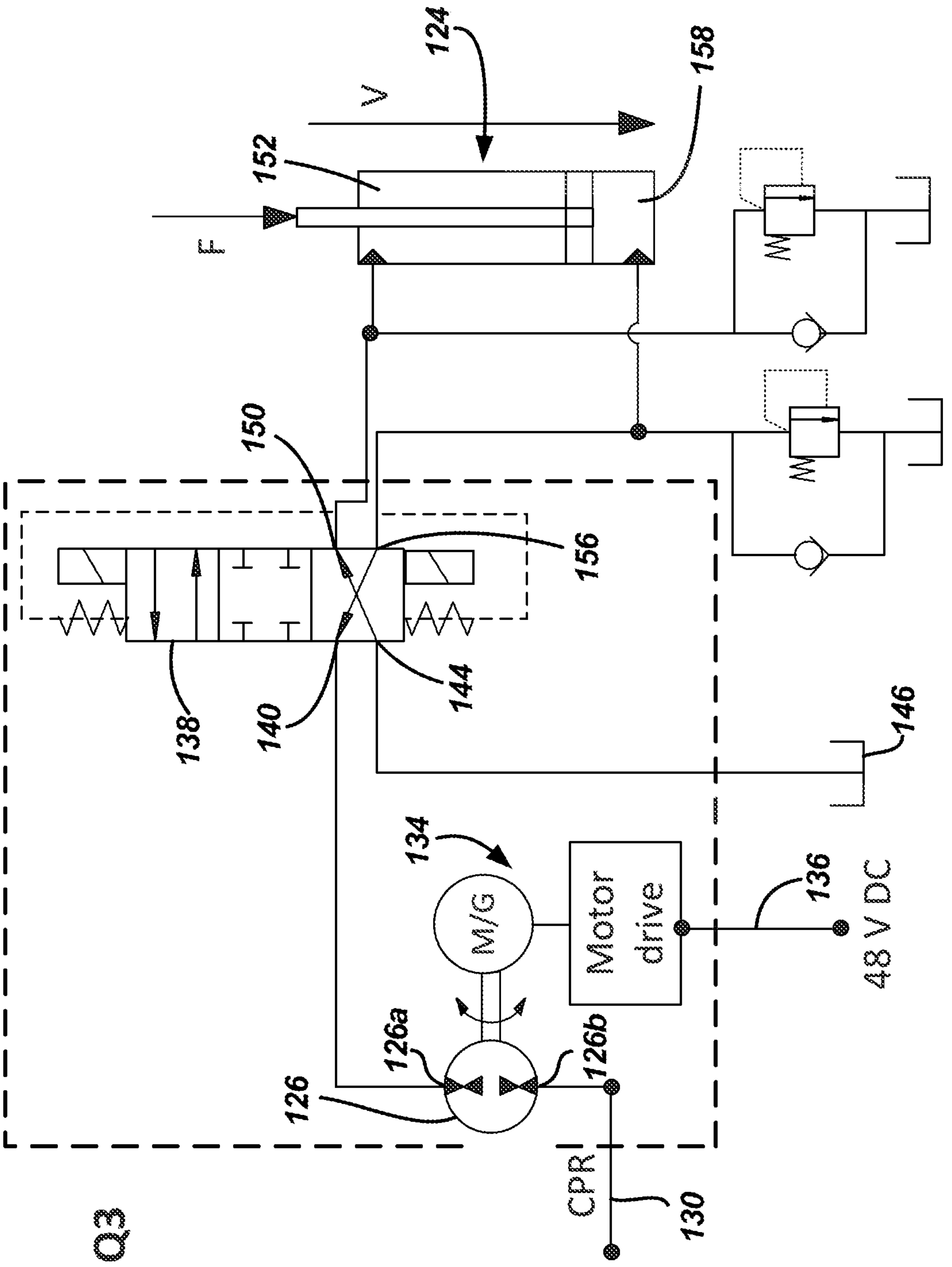
FIG. 7 illustrates the dual power electro-hydraulic motion control unit of FIG. 2 operating in a second over-running operating condition corresponding to third quadrant operation.
Figure 8:
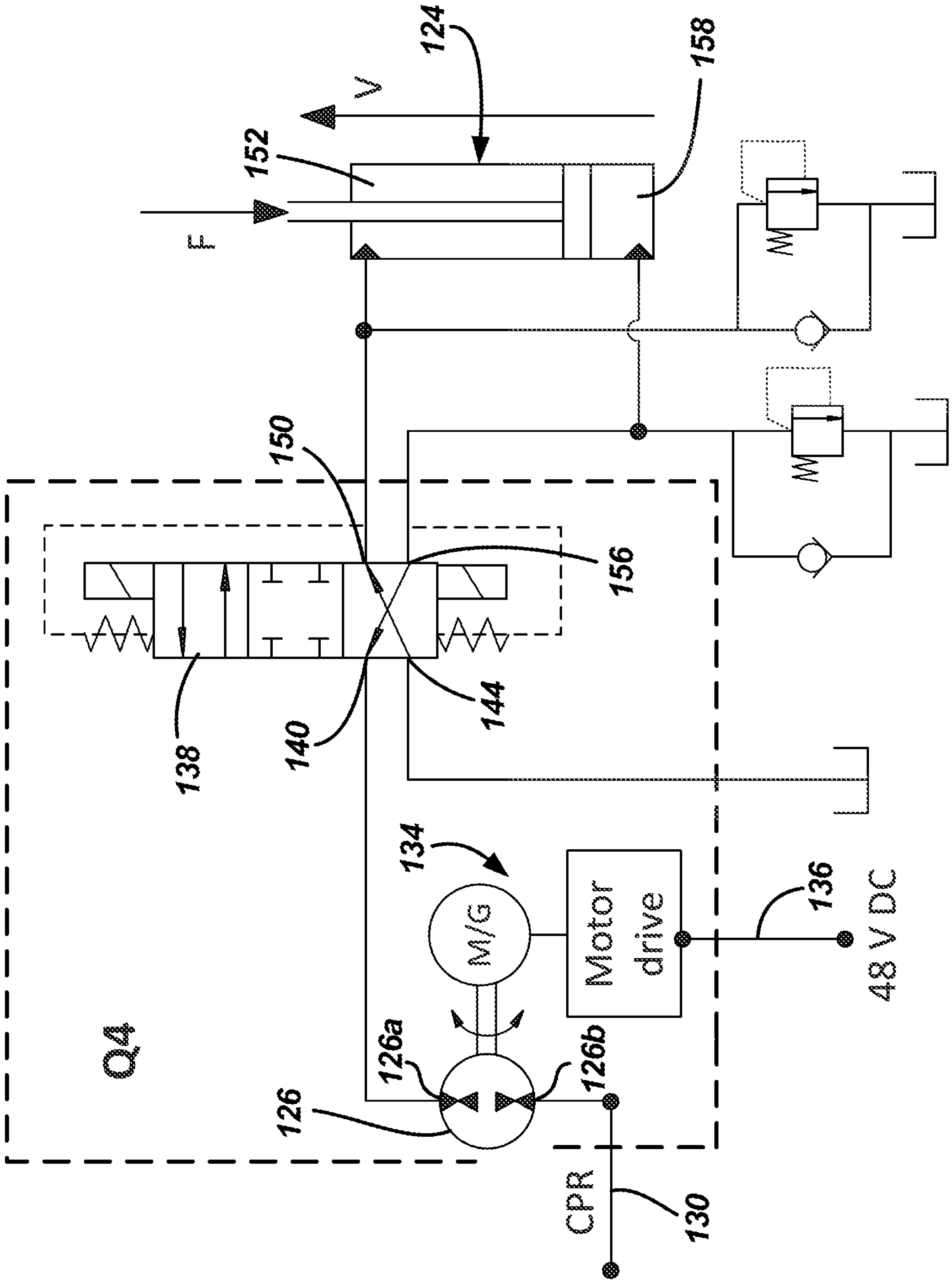
FIG. 8 illustrates the dual power electro-hydraulic motion control unit of FIG. 2 operating in a second passive operating condition corresponding to fourth quadrant operation.

The valve 138 is movable between a first position shown at FIGS. 5 and 6, a second position shown at FIGS. 7 and 8, and a third position shown at FIG. 2. When the valve 138 is in the first position of FIGS. 5 and 6, the pump port 140 is placed in fluid communication with the first actuator port 150 and the tank port 144 is placed in fluid communication with the second actuator port 156. Thus, the first hydraulic port 126*a* of the hydraulic pump/motor 126 is placed in fluid communication with the rod side 152 of the hydraulic cylinder 124 and the head side 158 of the hydraulic cylinder 124 is placed in fluid communication with tank 146. The first position of the valve 138 corresponds to the rod side 152 of the hydraulic cylinder 124 being the load-holding side of the hydraulic cylinder 124. With the valve 138 in the first position of FIGS. 5 and 6, the dual power electro-hydraulic motion control unit 122 can allow for first quadrant 180 or second quadrant 182 operation.

FIG. 5 shows the dual power electro-hydraulic motor control unit 122 operating in the first quadrant 180 which represents an over-running condition. In this condition, the force of the load applied to the piston rod drives hydraulic fluid flow from the rod side 152 of the hydraulic cylinder 124 back through the valve 138 to the hydraulic pump/motor 126. In this way, energy is transferred from the hydraulic cylinder 124 back to the dual power electro-hydraulic motor control unit 122. The flow of hydraulic fluid from the hydraulic cylinder 124 drives movement of the hydraulic pump/motor 126. Energy corresponding to the hydraulic fluid flow from the hydraulic cylinder 124 can be captured by an accumulator at the common pressure rail 130 and/or is used to drive the electric motor/generator 134 through drive shaft 127 thereby causing electricity to be generated which can be stored at a battery corresponding to the electrical power source 136.

FIG. 6 shows second quadrant 182 operation. When accommodating second quadrant operation, hydraulic power directed through the hydraulic pump/motor 126 from the CPR 130 can be directed to the rod side 152 of the hydraulic cylinder 124 and used to drive downward movement of the piston rod against the load force F applied to the piston rod. Depending upon the magnitude of power required to drive movement of the piston rod (i.e., the differential pressure required between the rod side 152 of the hydraulic cylinder 124 and the pressure provided by the CPR 130), the electric motor/generator 134 can either be operated as a generator which extracts energy from the hydraulic pump/motor 126 through the drive shaft 127 and stores the extracted energy at a battery for later use, or can be operated as a motor in which energy is transferred to the hydraulic pump/motor 126 through the drive shaft 127 to provide a boost of hydraulic pressure/flow to the hydraulic cylinder 124. It will be appreciated that when the electric motor/generator 134 is operated as a motor, blended power (e.g., power derived from the electrical power source and the hydraulic power source) is used to drive the hydraulic cylinder 124. It will be appreciated that when the electric motor/generator 134 is operated as a generator, the CPR 130 drives movement of the hydraulic cylinder 124 and the electric motor/generator 134 captures excess power provided by the CPR 130 that is not needed to drive the hydraulic cylinder 124.

In the operating condition of FIG. 6, power for driving movement of the hydraulic cylinder 124 can be provided by the hydraulic pressure source coupled to the second hydraulic port 126*b* of the hydraulic pump/motor 126 (e.g., the common pressure rail 130); by the electrical power source 136 which drives the motor/generator 134 coupled to the hydraulic pump/motor 126; or by blended power provided by both hydraulic power source coupled to the second hydraulic port 126*b* and the electrical power source 136 which drives the electrically driven motor/generator 134 coupled to the hydraulic pump/motor 126 by the drive shaft 127.

FIGS. 7 and 8 show the valve 138 in the second valve position. The valve 138 is moved to the second valve position when the head side 158 of the hydraulic cylinder 124 is the load holding side of the hydraulic cylinder 124. With the valve 138 in the second position of FIGS. 7 and 8, the pump port 140 is in fluid communication with the second actuator port 156 and the tank port 146 is in fluid communication with the first actuator port 150. Thus, the head side 158 of the hydraulic cylinder 124 is placed in fluid communication with the first hydraulic port 126*a* of the hydraulic pump/motor 126 and the rod side 152 of the hydraulic cylinder 124 is placed in fluid communication with tank 146. When the dual power electro-hydraulic motion control unit 122 is operating according to a third quadrant operation as shown at FIG. 7, the hydraulic cylinder 124 is over-running since the mode force F and the direction of travel of the piston rod V are both in the same direction (i.e., downward). In this over-running condition, the dual power electro-hydraulic motion control unit 122 controls the flow rate of the hydraulic fluid exiting the head side 158 of the hydraulic cylinder 124 to thereby manage or control the movement of the piston rod caused by the load force F. When operating in quadrant three operation 184, energy can be transferred from the hydraulic cylinder 124 back to the dual power electro-hydraulic motion control unit 122. Such power can be recaptured by means such as an accumulator at the CPR 130 and/or by operating the electric motor/generator 134 as a generator such that the hydraulic energy transferred from the hydraulic cylinder 124 can be converted to electrical energy which can be stored at a battery, capacitor or other structure.

FIG. 8 shows the dual power electro-hydraulic motion control unit 122 operating according to fourth quadrant 184 operation in which the direction of movement of the piston rod of the hydraulic cylinder 124 is opposite as compared to the load forced direction (e.g., the hydraulic cylinder 124 is extending with the piston moving upward against a downward load force F). Thus, when operating in the fourth quadrant operation, power is transferred from the dual power electro-hydraulic motion control unit 122 to the hydraulic cylinder 124 to drive movement of the piston rod in a direction that opposes the load force F applied to the piston rod. As depicted at FIG. 8, the piston rod is driven in an upward direction and the load force applied to the piston rod by the load is in a downward direction. It will be appreciated that power for driving movement of the hydraulic cylinder 124 can be provided by the common pressure rail 130, by the electric motor/generator 134, or through blended power provided by both the common pressure rail 130 and the electric motor/generator 134. For example, power for driving the hydraulic cylinder 124 can be provided by pressurized hydraulic fluid from the CPR 130 which is directed through the hydraulic pump/motor 126. The power directed through the hydraulic pump/motor 126 can be boosted as needed by operating the electric motor/generator 134 as a motor via power from the electrical power source 136, or can be reduced as needed by operating the electric motor/generator 134 as a generator which taps power from the hydraulic pump/motor 126 and directs the tapped power back to the electrical power source 136.

It will be appreciated that for any of the example dual power electro-hydraulic motion control units in accordance with the principles of the present disclosure, such units can be operated to control movement of the corresponding actuator (e.g., hydraulic cylinder) regardless of whether the actuator is being passively driven or is experiencing an over-running condition. When the actuator is being driven passively, energy is transferred from the dual power electro-hydraulic motion control unit to the actuator. The power can be derived from a source of hydraulic power that is transferred through a hydraulic pump/motor, or by power applied to the hydraulic pump/motor by an electric motor/generator, or by blended power provided by both the source of hydraulic power and the electric motor/generator. By operating the electric motor/generator as a motor, the electric motor/generator can be used to boost power provided to the hydraulic actuator by the hydraulic power source. By operating the electric motor/generator as a generator, the electric motor can be used to reduce the power provided to the hydraulic actuator by the hydraulic power source. When the actuator is experiencing an over-running condition, energy can be transferred from the actuator back to the dual power electro-hydraulic motion control unit. Such energy can be captured and stored by operating the electric motor/generator as a generator such that hydraulic energy can be converted to electrical energy which may be stored at a battery or like structure, or can be stored as hydraulic energy within an accumulator that may correspond to the source of hydraulic power (e.g., a common pressure rail).

Referring back to FIG. 2, when the valve 138 of the dual power electro-hydraulic motion control unit 122 is in the third position, the rod side 152 and the head side 158 are both disconnected from tank 146 and from the hydraulic pump/motor 126. In this configuration, the hydraulic cylinder 124 is hydraulically locked and thereby hydraulically held at the current position against the force of the load acting on the hydraulic cylinder. By using the valve 138 to hydraulically lock the hydraulic cylinder 124 for load holding purposes, it is not necessary to use the electric motor/generator 134 to provide a load holding function. This is advantageous because hydraulically locking the hydraulic cylinder 124 in place is more efficient than operating the electric motor/generator 134 at a stalled condition suitable for providing load holding.

Figure 9:
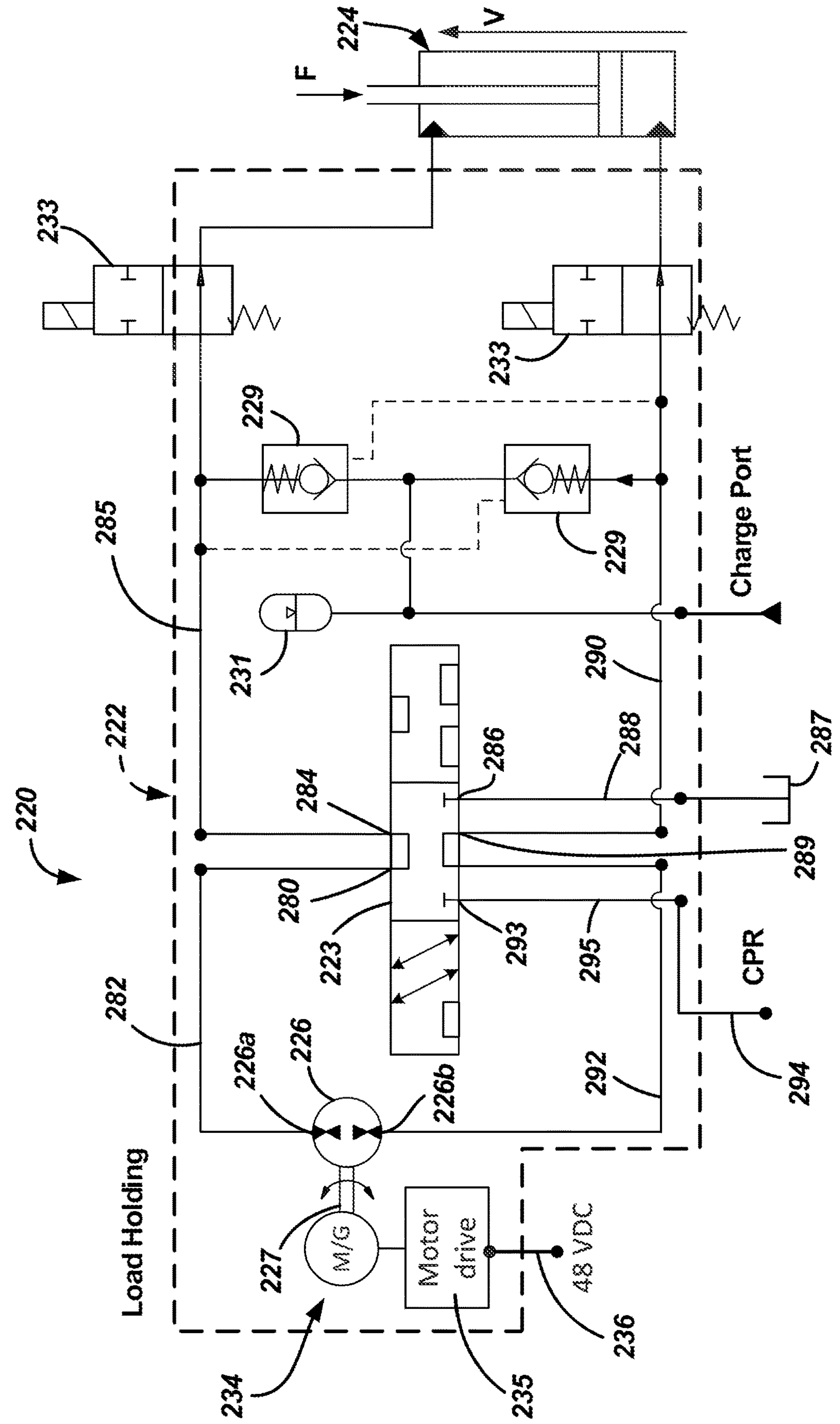
FIG. 9 illustrates a second dual power electro-hydraulic motion control unit in accordance with the principles of the present disclosure, the dual power electro-hydraulic motion control unit includes a mode switching valve that allows the unit to be selectively operated in either a dual power mode or a conventional electro-hydraulic mode.

FIGS. 9-12 show another electro-hydraulic actuation system 220 in accordance with the principles of the present disclosure. The electro-hydraulic actuation system 220 includes an electro-hydraulic motion control unit 222 including a mode switching valve 223 for switching the electro-hydraulic motion control unit 222 between a dual power mode in which the electro-hydraulic motion control unit 222 has dual power functionality of the type described with respect to the dual power electro-hydraulic motion control unit 122 of FIGS. 2-8, and a second mode in which power is provided only by an electric motor/generator. Referring to FIG. 9, the electro-hydraulic motion control unit 222 is shown coupled to an actuator such as a hydraulic cylinder 224. The electro-hydraulic motion control unit 222 includes an electric motor/generator 234 having a motor drive 235 coupled to an electrical power source such as an electrical bus 236. It will be appreciated that the electrical bus 236 provides electrical energy to the electric motor/generator 234 for driving the electric motor/generator 234 when the electric motor/generator 234 is operated as a motor. Further, the electrical bus 236 is adapted to receive electrical power from the electric motor/generator 234 when the electric motor/generator 234 is operated as a generator. The electro-hydraulic motion control unit 222 further includes a drive shaft 227 or other mechanical coupling means that mechanically couples the motor/generator 234 to a hydraulic pump/motor 226. The drive shaft 227 allows energy to be transferred from the motor/generator 234 to the hydraulic pump/motor 226 to drive the hydraulic pump/motor 226 as a hydraulic pump when the electric motor/generator 234 is operated as a motor. Also, when the hydraulic pump/motor 226 is operated as a motor or when power is otherwise desired to be extracted from the hydraulic pump/motor, the drive shaft 227 allows energy to be transferred to the electric motor/generator 234 for driving the electric motor/generator 234 as a generator which generates electricity that can be stored by a battery or other structure coupled to the electrical bus 236.

The electro-hydraulic motion control unit 222 further includes valves 229 and a hydraulic fluid accumulator 231 which are used to provide fluid volume compensation for compensating for the unequal displacement of fluid between the head side and the rod side of the hydraulic cylinder 224. The electro-hydraulic motion control unit 222 further can include optional load holding valves 233 that can be selectively closed to hydraulically lock the hydraulic cylinder 224 at a given position.

The mode switching valve 223 is depicted as a three-position valve that preferably can be moved between the different positions by an actuator such as a solenoid or a voice coil actuator. The mode switching valve 223 includes a first pump/motor port 280 hydraulically connected to a first port 226*a* of the hydraulic pump/motor 226 by a hydraulic fluid line 282. The mode switching valve 223 also includes a first actuator port 284 hydraulically coupled to a rod side of the hydraulic cylinder 224 by hydraulic fluid line 285. The mode switching valve 223 also includes a tank port 286 hydraulically connected to tank 287 by a hydraulic fluid line 288. The mode switching valve 223 also includes a second actuator port 289 hydraulically coupled to the head side of the hydraulic cylinder 224 by a hydraulic fluid flow line 290. The mode switching valve 223 further includes a second pump/motor port 291 hydraulically coupled to a second port 226*b* of the hydraulic pump/motor 226 by a hydraulic fluid flow line 292. Additionally, the mode switching valve 223 includes a dual power activation port 293 coupled to a source of hydraulic pressure and/or a means for storing hydraulic pressure such as a CPR 294 by a hydraulic flow line 295.

Figure 10:
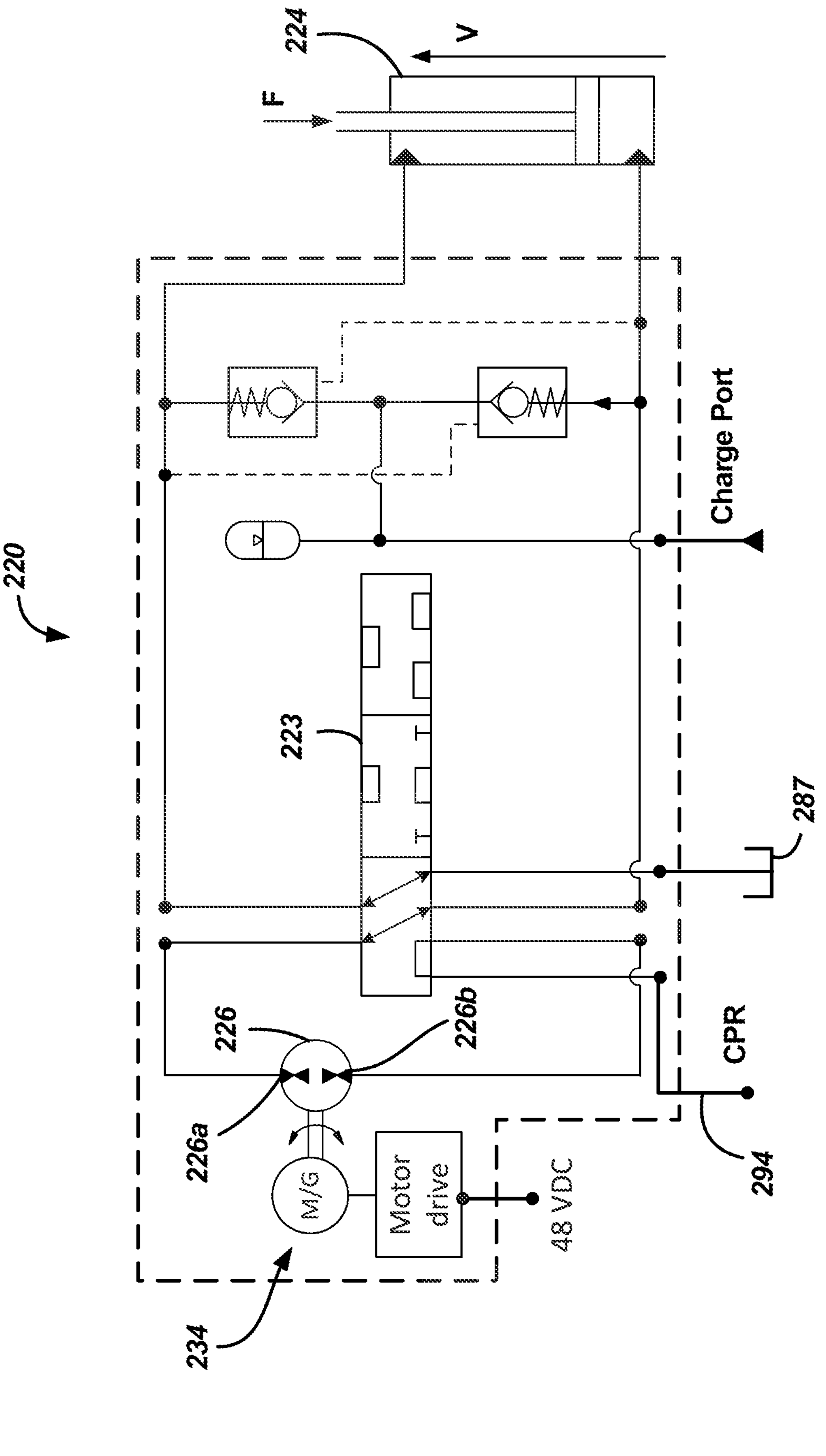
FIG. 10 shows the dual power electro-hydraulic motion control unit of FIG. 9 operating in a dual power mode in which a hydraulic cylinder powered by the unit is caused to extend.

FIG. 10 shows the electro-hydraulic motion control unit 222 with the mode switching valve 223 in a first position in which the first port 226*a* of the hydraulic pump/motor 226 is in fluid communication with the head side of the hydraulic cylinder 224, the second port 226*b* of the hydraulic pump/motor 226 is in fluid communication with the CPR 294, and the rod side of the hydraulic cylinder 224 is in fluid communication with tank 287. In the configuration of FIG. 10, the head side of the hydraulic cylinder 224 is the load holding side of the hydraulic cylinder 224. In the configuration of FIG. 10, the electro-hydraulic motion control unit 222 can provide fourth quadrant 186 operation for passively driving the piston of the hydraulic cylinder 224 upwardly against the load. It will be appreciated that the fourth quadrant 186 operation of the electro-hydraulic motion control unit 222 is the same as the fourth quadrant 186 operation of the dual power electro-hydraulic motion control unit 122 described with respect to FIG. 8. In the configuration of FIG. 10, the electro-hydraulic motion control unit 222 can also provide third quadrant 184 operation corresponding to an over-running condition where both the direction of travel of the hydraulic piston and the load on the piston are downward. It will be appreciated that the third quadrant 184 operation of the electro-hydraulic motion control unit 122 is the same as the third quadrant 184 operation of the dual power electro-hydraulic motion control unit 122 described with respect to FIG. 7.

Figure 11:
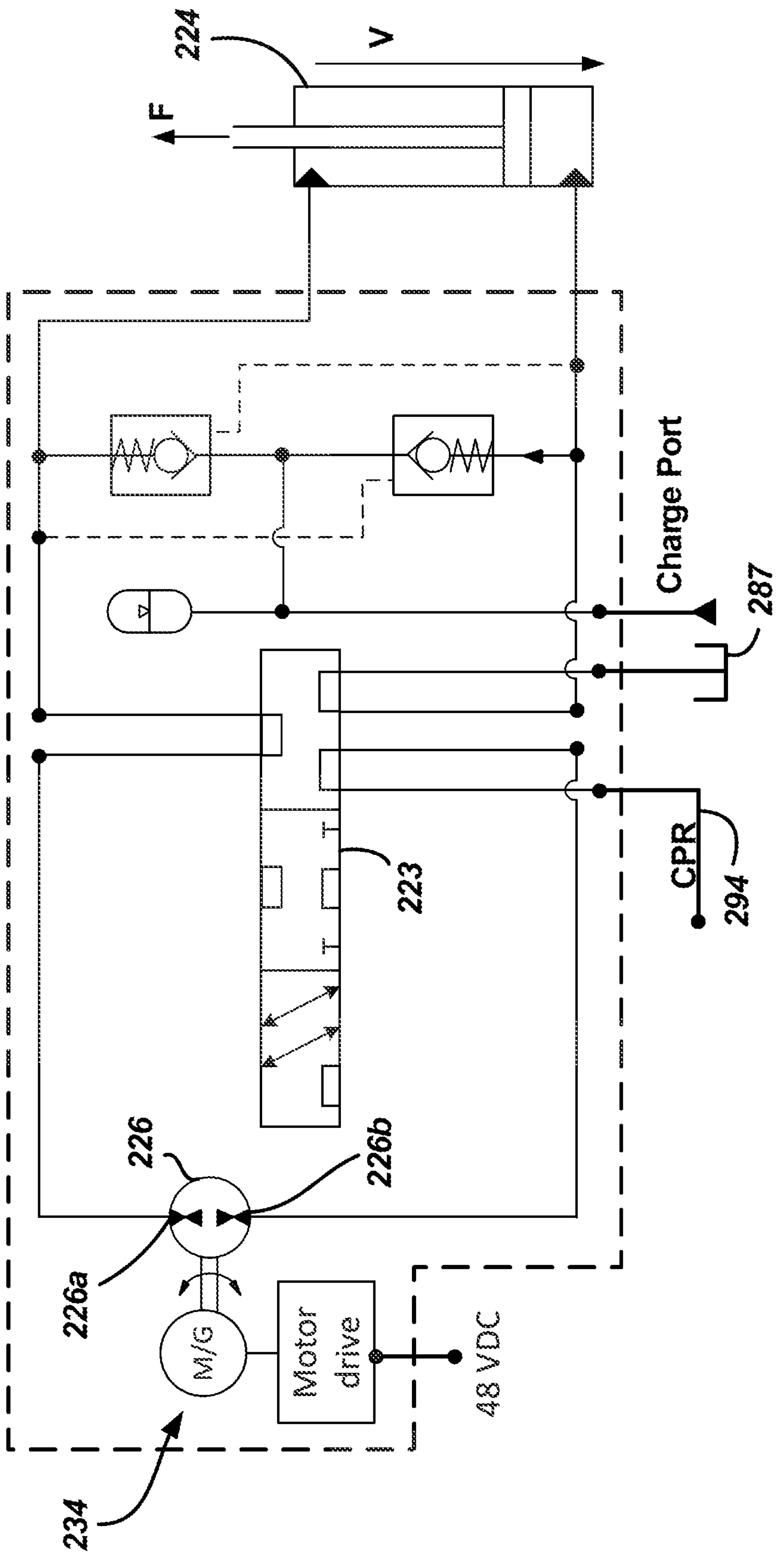
FIG. 11 shows the dual power electro-hydraulic motion control unit of FIG. 9 operating in a dual power mode in which the unit is used to cause the hydraulic cylinder to retract.

FIG. 11 shows the electro-hydraulic motion control unit 222 with the mode switching valve 223 in a second position in which the first port 226*a* of the hydraulic pump/motor 226 is in fluid communication with the rod side of the hydraulic cylinder 224, the second port 226*b* of the hydraulic pump/motor 226 is in fluid communication with the CPR 294, and the head side of the hydraulic cylinder 224 is in fluid communication with tank 287. In this configuration, the rod side of the hydraulic cylinder 224 is the load holding side of the hydraulic cylinder 224. While operating in the configuration of FIG. 11, the electro-hydraulic motion control unit 222 can provide either first quadrant 180 operation for an over-running condition in which the load and the direction of movement of the hydraulic piston are both in an upward direction, or second quadrant 182 operation for driving the piston rod downwardly against an upward load. It will be appreciated that first quadrant 180 operation of the electro-hydraulic motion control unit 222 is the same as the first quadrant 180 operation of the electro-hydraulic motion control unit 122 described with respect to FIG. 5. It will also be appreciated that the second quadrant 182 operation of the electro-hydraulic motion control unit 222 is the same as the second quadrant 182 operation of the electro-hydraulic motion control unit 122 described with respect to FIG. 6.

Figure 12:
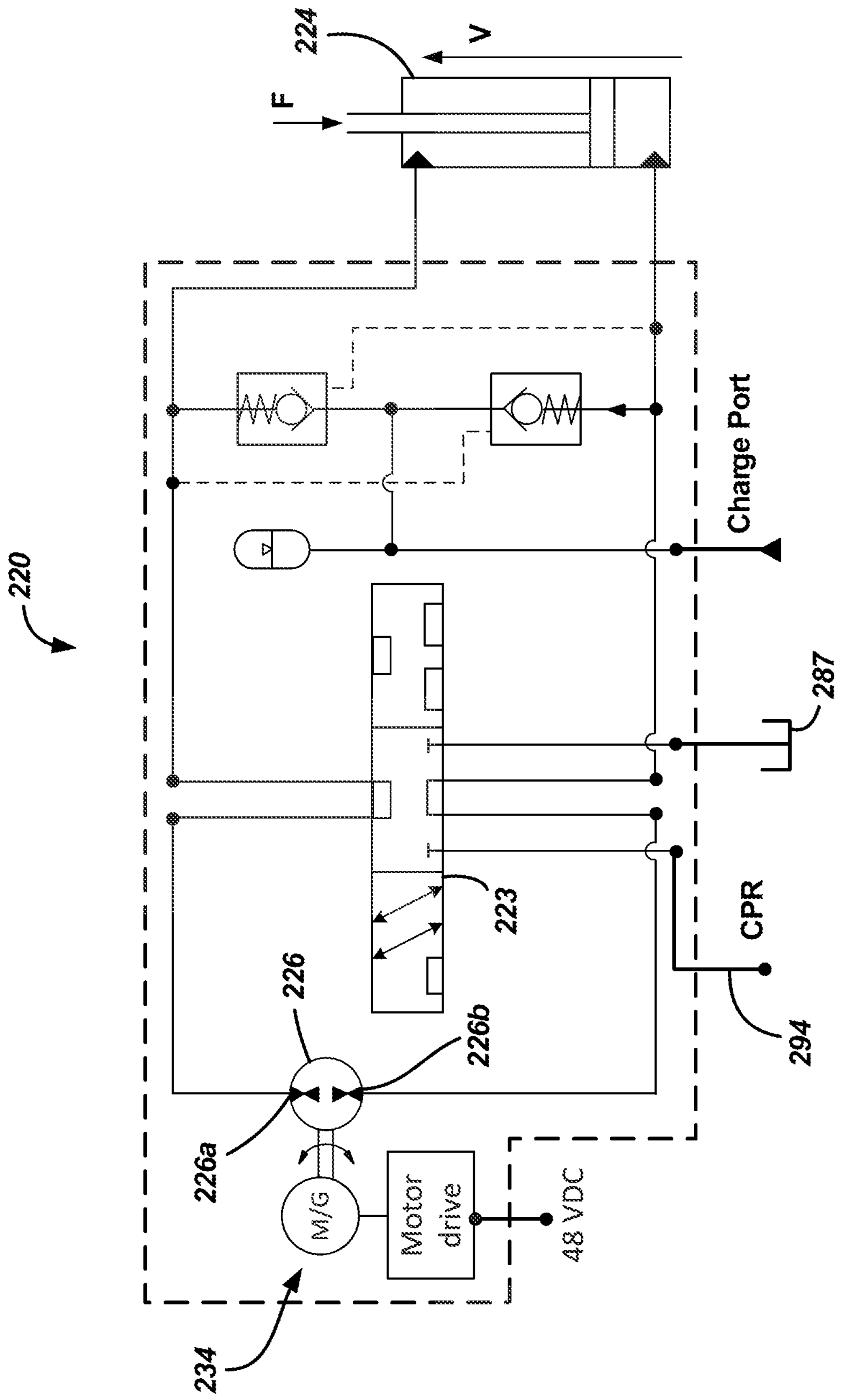
FIG. 12 shows the dual power electro-hydraulic motion control unit of FIG. 9 operating in a conventional electro-hydraulic mode in which only the electric motor/generator is used to transmit power to or receive power from the hydraulic pump.
Figure 13:
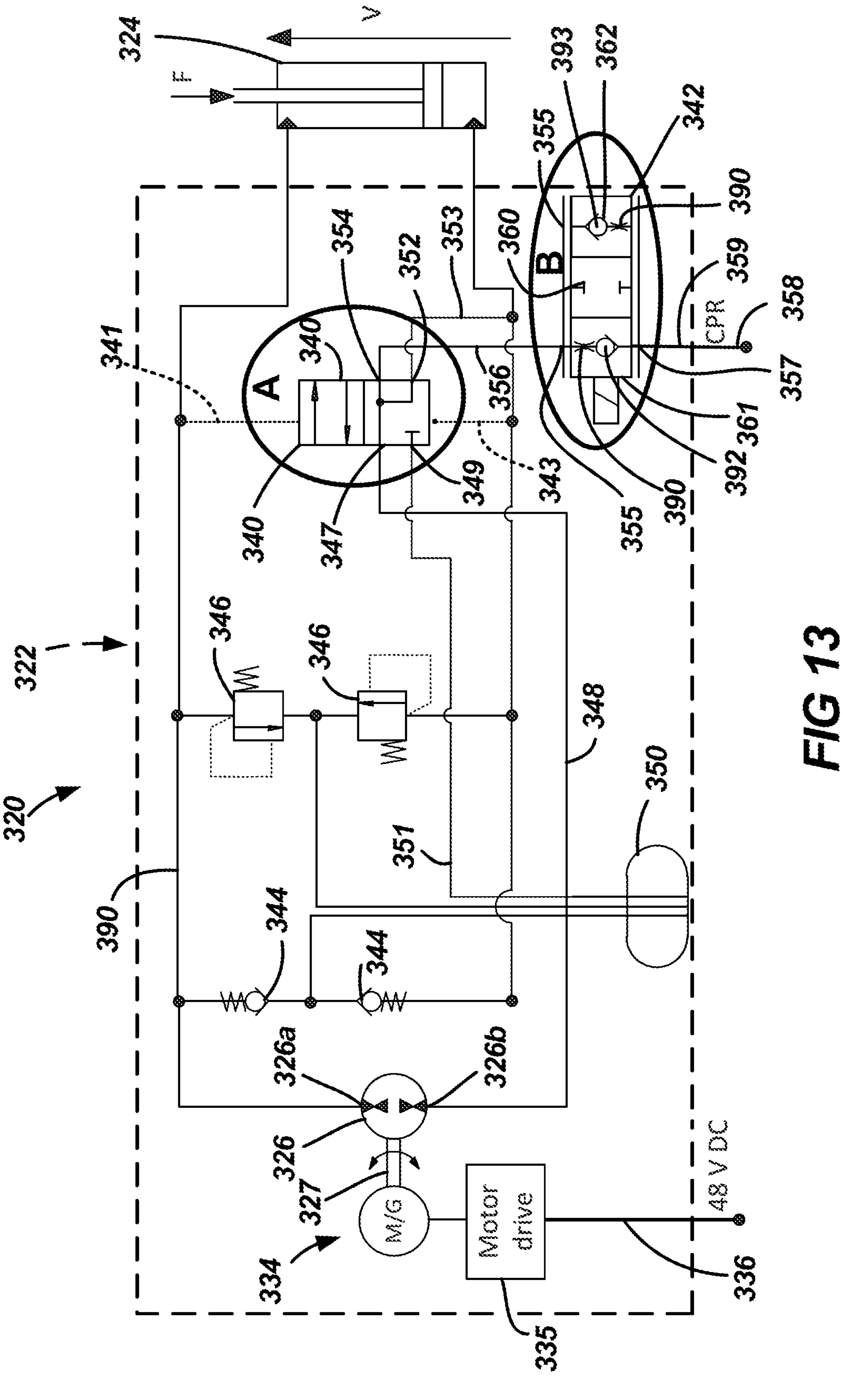
FIG. 13 depicts another dual power electro-hydraulic motion control unit in accordance with the principles of the present disclosure.

FIG. 12 shows the electro-hydraulic motion control unit 222 with the mode switching valve 223 in a third position where the first port 226*a* of the hydraulic pump/motor 226 is in fluid communication with the rod side of the hydraulic cylinder 224, the second port 226*b* of the hydraulic pump/motor 226 is in fluid communication with the head side of the hydraulic cylinder 224, and the CPR 294 as well as tank 287 are isolated from the hydraulic pump/motor 226 and the hydraulic cylinder 224. In this configuration, only the motor/generator 234 can be used to drive the hydraulic pump/motor 226.

FIGS. 13-17 depict a third electro-hydraulic actuation system 320 in accordance with the principles of the present disclosure. The electro-hydraulic actuation system 320 includes an electro-hydraulic motion control unit 322 hydraulically coupled to a hydraulic cylinder 324. The electro-hydraulic motion control unit 322 includes an electric motor/generator 334 including a motor drive 335 coupled to an electrical bus 336 and a drive shaft 327 coupled to a hydraulic pump/motor 326. The hydraulic pump/motor 326 includes a first port 326*a* and a second port 326*b*. Preferably the hydraulic pump/motor 326 is bi-directional. The electro-hydraulic motion control unit 322 includes a valve 340 such as a two-position hydraulically piloted valve. The electro-hydraulic motion control unit 322 also includes a valve 342 such as a three-position proportional valve which can be moved between its different positions by an actuator such as a solenoid or a voice coil actuator. The valve 340 is piloted to automatically connect hydraulic power to the load holding side of the hydraulic cylinder 324. The valve 342 controls any additional hydraulic power being input into or output from the load holding chamber of the hydraulic cylinder 324. The electro-hydraulic motion control unit 322 also includes check valves 344 for preventing cavitation in the hydraulic cylinder 324, and pressure relief valves 346 for preventing the hydraulic pressure within the hydraulic cylinder 324 from exceeding the relief pressure set by the pressure relief valves 346.

The valve 340 is a hydraulically piloted operated valve that is piloted to a first position (see FIGS. 14 and 15) by pilot line 341 when the rod side of the hydraulic cylinder 324 is the load holding side of the hydraulic cylinder 324 and is piloted to a second position (see FIGS. 16 and 17) by pilot line 343 when the head side of the hydraulic cylinder 324 is the load holding side of the hydraulic cylinder 324. The valve 340 includes a pump port 347 fluidly coupled to the port 326*b* of the hydraulic pump/motor 326 by hydraulic fluid line 348. The valve 340 also includes a tank port 349 fluidly coupled to tank 350 by a hydraulic fluid line 351. The valve 340 further includes an actuator port 352 fluidly connected to the head side of the hydraulic cylinder 324 by hydraulic fluid line 353. The valve 340 further includes a hydraulic power port 354 fluidly connected to a port 355 of the valve 342 by a hydraulic fluid line 356. The first port 326*a* of the hydraulic pump/motor 326 is fluidly connected to the rod side of the hydraulic cylinder 324 by hydraulic flow line 390.

The valve 342 is preferably a proportional valve that is movable between three positions. As indicated above, the valve 342 includes a port 355 fluidly connected to the hydraulic power port 354 of the valve 340 by hydraulic fluid line 356. The valve 342 also includes a port 357 connected to a common pressure rail 358 by a hydraulic fluid line 359. The valve 340 can include a center position 360 that blocks fluid communication between the ports 355, 357. The valve 342 also can include a left position 361 that provides fluid communication between the ports 355, 357 and includes a one-way check valve 392 that allows flow to move through the valve 342 from the port 357 to the port 355. The valve 342 also includes a right position 362 that provides fluid communication between the ports 355, 357 and includes a one-way check valve 393 that allows hydraulic fluid flow in a direction from the port 355 to the port 357. The valve 342 is configured for metering flow between the ports 355, 357 when in the left and right positions as indicated by orifices 394 which are preferably variable orifices.

Figure 14:
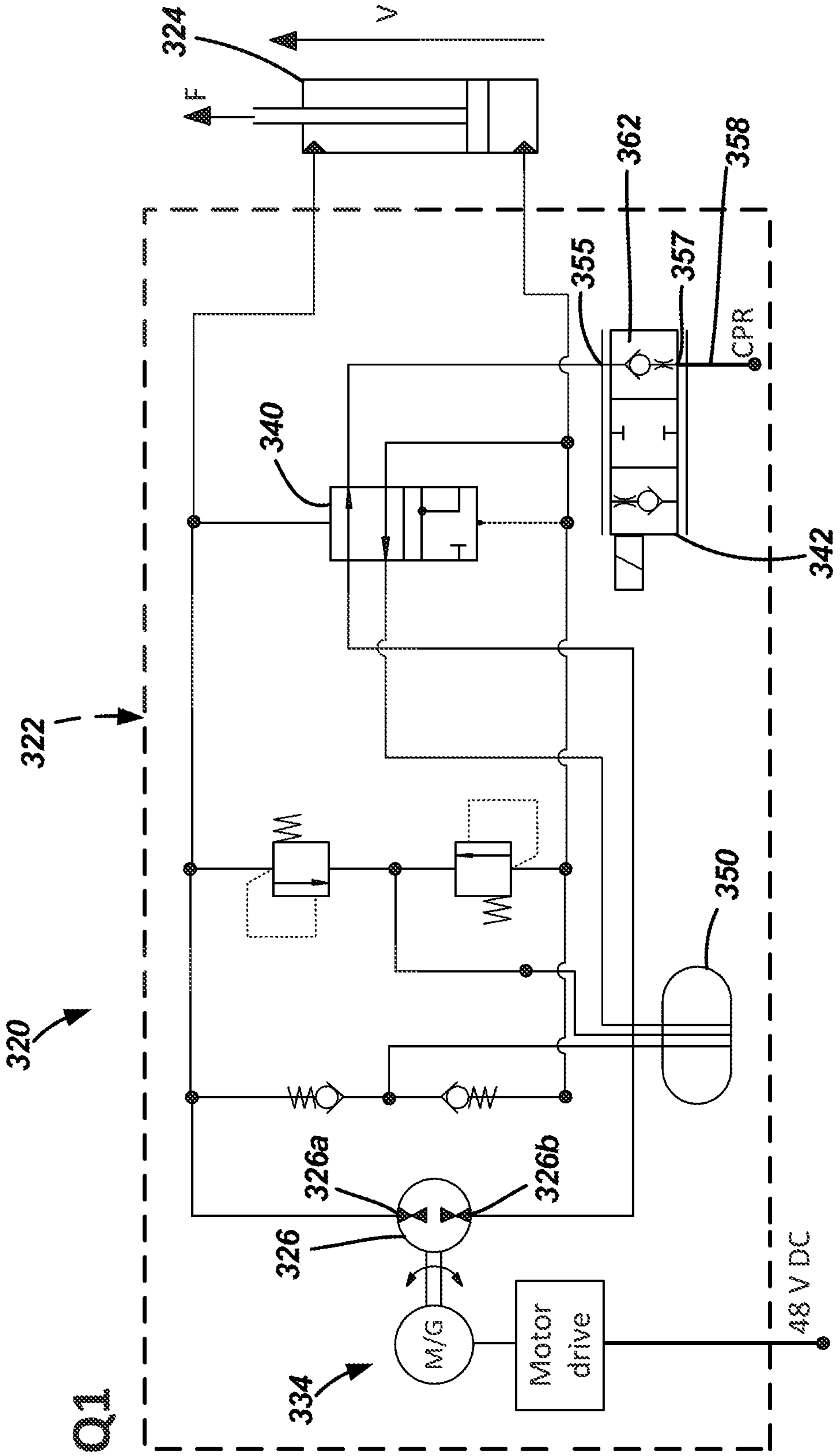
FIG. 14 shows the dual power electro-hydraulic motion control unit of FIG. 13 operating in the first over-running operating condition corresponding to first quadrant operation.

FIG. 14 shows the electro-hydraulic motion control unit 322 operating in a first quadrant 180 operation in which the piston of the hydraulic cylinder 324 is over-running in an upward direction and the rod side of the hydraulic cylinder 324 is load-holding. In the configuration of FIG. 14, the first port 326*a* of the hydraulic pump/motor 326 is fluidly connected to the rod side of the hydraulic cylinder 324, the head side of the hydraulic cylinder 324 is fluidly connected to tank 350 through the valve 340, and the second port 326*b* of the hydraulic pump/motor 326 is fluidly connected to the common pressure rail 358 through the valves 340 and 342. The valve 340 has been piloted to the first position and the valve 342 is in the right position 362. Hydraulic pressure and flow from the rod side of the hydraulic cylinder 324 will drive the hydraulic pump/motor 326 as a pump such that energy can be recaptured by the electric motor/generator 334. Additionally, hydraulic fluid flow through the hydraulic pump/motor 326 can flow to the common pressure rail 358 through the valves 340 and 342 where hydraulic energy can be stored at an accumulator or a like device.

Figure 15:
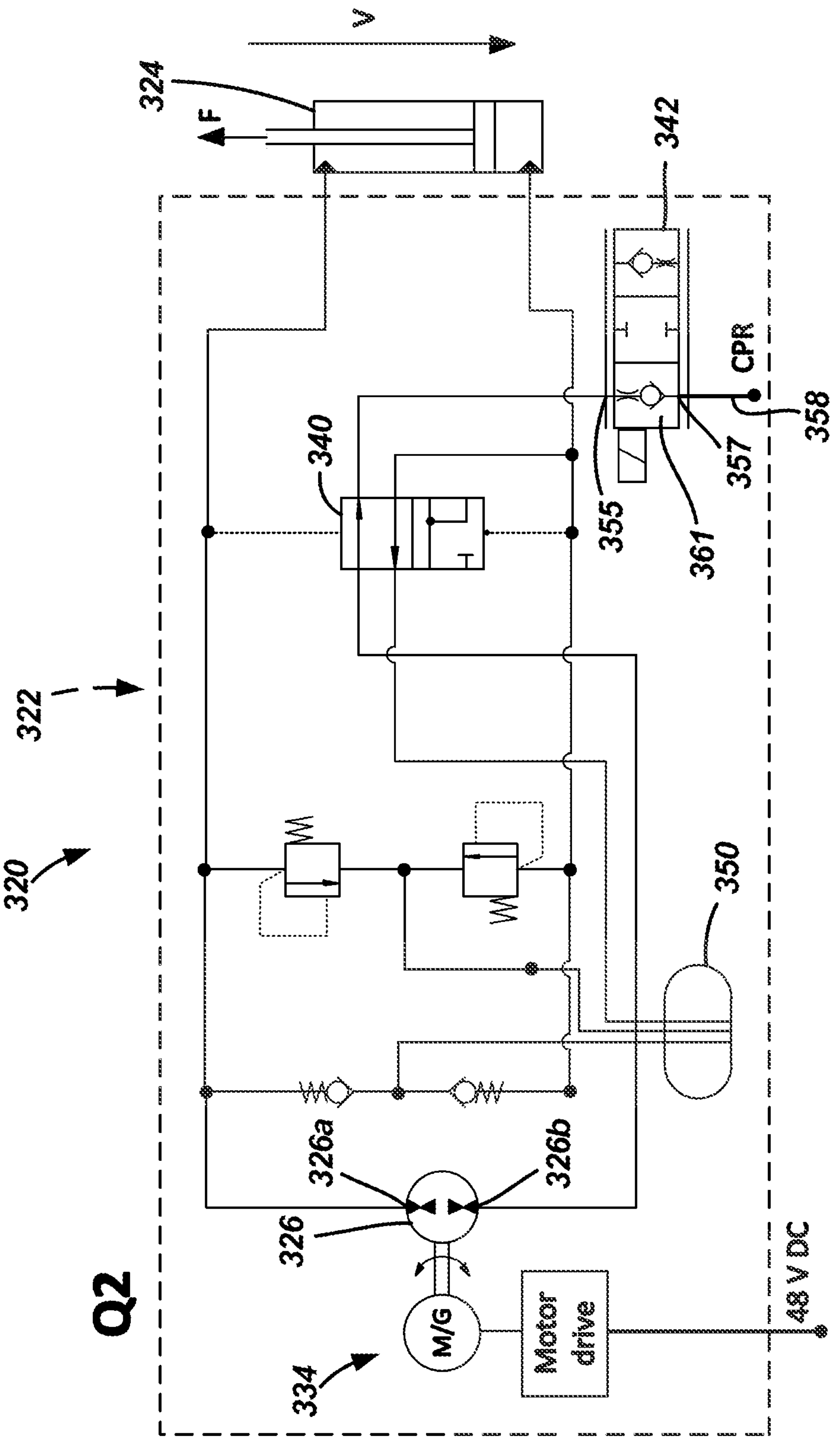
FIG. 15 shows the dual power electro-hydraulic motion control unit of FIG. 13 operating in the first passive operating condition corresponding to second quadrant operation.

FIG. 15 shows the electro-hydraulic motion control unit 322 operating in the second quadrant 182 operation in which the piston rod of the hydraulic cylinder 324 is driven passively downwardly against an upward load and the rod side of the hydraulic cylinder 324 is load holding. In this configuration, the first port 326*a* of the hydraulic pump/motor 326 is in fluid communication with the rod side of the hydraulic cylinder 324, the second port 326*b* of the hydraulic pump/motor 326 is in fluid communication with the common pressure rail 358 and the head side of the hydraulic cylinder 324 is in fluid communication with tank 350. In the configuration of FIG. 14, the valve 340 is piloted to the first position and the valve 342 has been moved to the left position 361. Thus, dual power provided by the CPR 358 and the electric motor/generator 334 can be used to pressurize the rod side of the hydraulic cylinder 324 and drive movement of the hydraulic cylinder 324. The valves 340, 342 cooperate to couple the common pressure rail 358 to the second port 326*b* of the hydraulic pump/motor 326 such that positive hydraulic pressure from the common pressure rail 358 can be provided to the port 326*b* of the hydraulic pump/motor 326.

Figure 16:
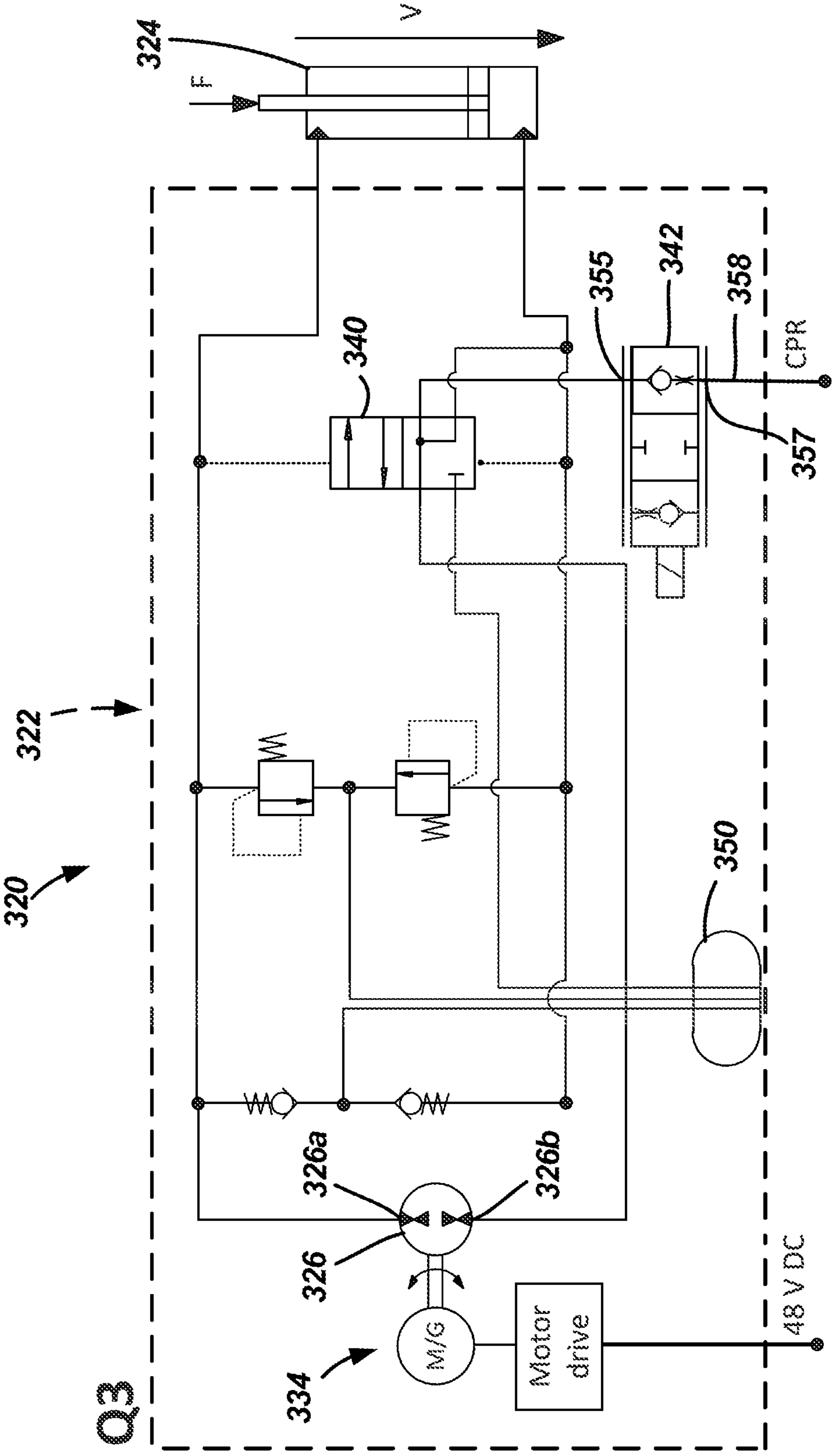
FIG. 16 illustrates the dual power electro-hydraulic motion control unit of FIG. 13 operating in the second over-running operating condition corresponding to third quadrant operation.

FIG. 16 shows the electro-hydraulic motion control unit 322 operating in the third quadrant 184 operation in which the piston of the hydraulic cylinder 324 is over-running in a downward direction. In the configuration of FIG. 16, the valve 340 is piloted to the second position and the head side of the hydraulic cylinder 324 is the load holding side of the hydraulic cylinder 324. In the configuration of FIG. 16, the port 326*a* of the hydraulic pump/motor 326 is fluidly connected to the rod side of the hydraulic cylinder 324, the port 326*b* of the pump/motor 326 is fluidly connected to the common pressure rail 358 through the valves 340 and 342, and the head side of the hydraulic cylinder 324 is fluidly connected to the common pressure rail 358 as well as the port 326*b* of the hydraulic pump/motor 326. Hydraulic fluid expelled from the head side of the hydraulic cylinder 324 can be directed to the common pressure rail 328 for hydraulic energy storage or for use at another motion control unit, and can also be directed across the hydraulic pump/motor 326 to drive the hydraulic pump/motor 326 as a motor thereby driving the electric motor/generator 334 as a generator for generating electricity that can be stored or used at another motion control unit. The valve 342 is in the right position so that flow is permitted from the port 355 to the port 357 but is blocked in the opposite direction by the check valve.

Figure 17:
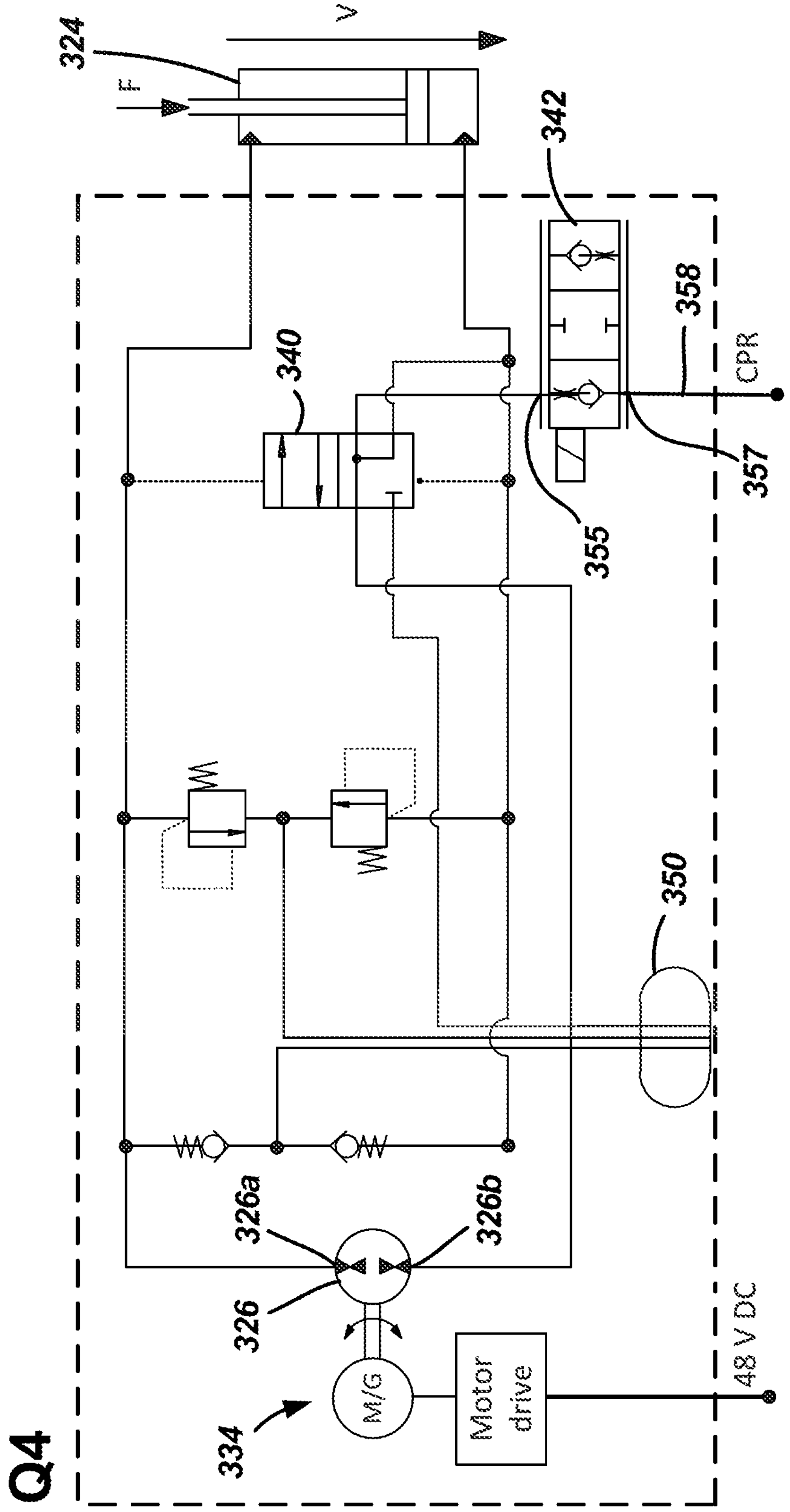
FIG. 17 depicts the dual power electro-hydraulic motion control unit of FIG. 13 operating in the second passive operating condition corresponding to fourth quadrant operation.

FIG. 17 shows the electro-hydraulic motion control unit 322 operating in the fourth quadrant 186 operation in which the piston of the hydraulic cylinder 324 is driven passively in an upward direction against a downward load. In this configuration, the head side of the hydraulic cylinder 324 is the load holding side and the valve 340 is piloted to the second position. Also, the valve 342 is in the left position such that hydraulic fluid flow is permitted from the port 357 to the port 355 so that hydraulic fluid can flow from the common pressure rail 358 to the electro-hydraulic motion control unit 322 but is prevented by the check valve from flowing from the electro-hydraulic motion control unit 322 back to the common pressure rail 358. The port 326*a* of the pump/motor 326 is fluidly connected to the rod side of the hydraulic cylinder 324 and the port 326*b* of the pump/motor 326 is fluidly connected to both the head side of the hydraulic cylinder 324 and the common pressure rail 358. Power from the common pressure rail 358 as well as power from the electric motor/generator 334 can be blended and used to supply pressurized hydraulic fluid to the head side of the hydraulic cylinder 324 for driving the hydraulic cylinder upwardly.

In certain examples, the electro-hydraulic motion control unit 322 can be operated with the valve 342 in the center position. When the valve 342 is in the center position 360, the common pressure rail 358 is disconnected from the electro-hydraulic motion control unit 322 so that only the electric motor/generator 334 can be used to provide power to the hydraulic cylinder 324. Similarly, during over-running conditions, only the electric motor/generator 334 is available for recapturing energy outputted from the hydraulic cylinder 324.

Figure 18:
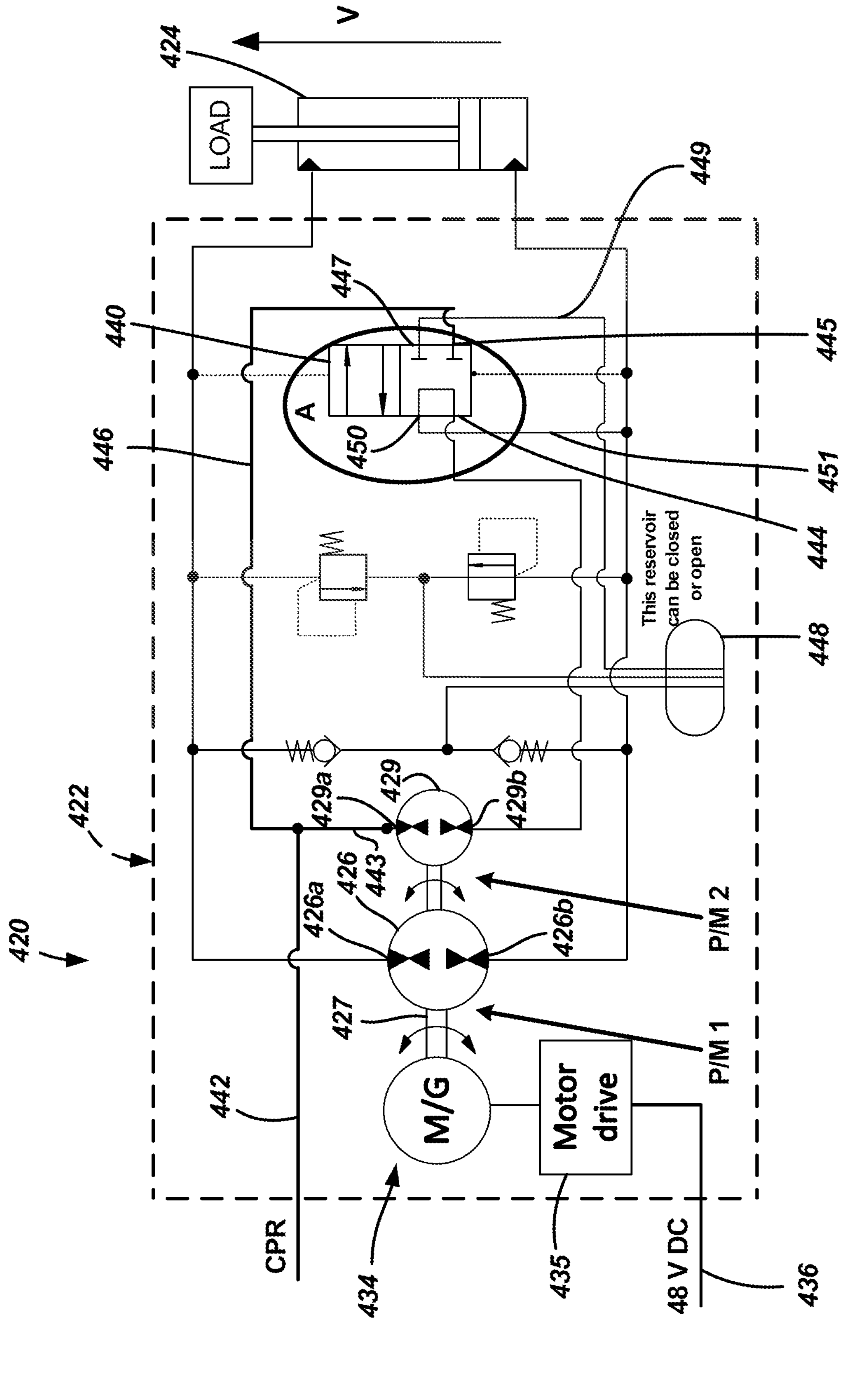
FIG. 18 depicts a fourth dual power electro-hydraulic motion control unit in accordance with the principles of the present disclosure.

FIG. 18 shows a fourth electro-hydraulic actuation system 420 in accordance with the principles of the present disclosure. The electro-hydraulic actuation system 420 includes an electro-hydraulic motion control unit 422 fluidly connected to a hydraulic cylinder 424. The electro-hydraulic motion control unit 422 includes an electric motor/generator 434 having a motor drive 435 connected to an electrical line such as an electrical bus 436. The electric motor/generator 434 includes a drive shaft 427 which is rotates with the electric motor/generator. First and second bi-directional pump/motors 426, 429 are coupled to the drive shaft 427 for rotation therewith. The first pump/motor 426 includes a first port 426*a* in fluid connection with the rod side of the hydraulic cylinder 424 and a second port 426*b* in fluid communication with a head side of the hydraulic cylinder 424. The electro-hydraulic motion control unit 422 also includes a pilot operated valve 440 that is automatically piloted between first and second positions. In operation, the pilot operated valve 440 is automatically piloted to a position in which blended power can be provided to the load holding side of the hydraulic cylinder 424. The second pump/motor 429 includes a first port 429*a* fluidly connected to a common pressure rail 442 by a hydraulic fluid line 443.

It will be appreciated that the electric motor/generator 434, the first pump/motor 426 and the second pump/motor 429 are all mechanically coupled to and rotate with the drive shaft 427 such that the assembly can function as a transformer for mechanically transferring power between the various systems, circuits and/or components.

A second port 429*b* of the second pump/motor 429 is fluidly connected to a pump port 444 of the pilot operated valve 440. The pilot operated valve 440 also includes a common pressure rail port 445 fluidly connected to the common pressure rail 442 by a hydraulic fluid line 446. The pilot operated valve 440 further includes a tank port 447 fluidly connected to tank 448 by a hydraulic fluid line 449 and an actuator port 450 fluidly connected to the head side of the hydraulic cylinder 424 and the second port 426*b* of the first pump/motor by hydraulic fluid line 451.

FIG. 18 shows the electro-hydraulic motion control unit 422 operating in a condition in which the head side of the hydraulic cylinder 424 is the load holding side of the hydraulic cylinder 424. The pilot operated valve 440 is in a first position in which tank 440 is disconnected from the hydraulic cylinder 424 and the head side of the hydraulic cylinder 424 is fluidly connected to both the second port 426*b* of the first pump/motor 426 and the second port 429*b* of the second pump/motor 429. The area difference between the head and rod sides of the hydraulic cylinder 424 leads to a flow difference. This flow difference will be compensated by the second pump/motor 429. The second pump/motor 429 takes flow from the common pressure rail 442 instead of tank 448 to provide hydraulic power to the hydraulic cylinder 424 and directs flow to the CPR 442 to transfer power from the hydraulic cylinder 424 to the common pressure rail 442. Thus, blended power from the common pressure rail 442 and the electric motor/generator 434 can be provided to the hydraulic cylinder during passive conditions, and power output from the hydraulic cylinder 424 during over-running conditions can be transferred to the electric motor/generator 434 and/or the common pressure rail 442.

When the rod side of the hydraulic cylinder 424 is the load holding side of the hydraulic cylinder 424, the pilot operated valve 440 shifts to a second position. In the second position, the head side of the hydraulic cylinder 424 is fluidly connected to tank 448 by the pilot valve 440 and the second port 429*b* of the second pump/motor 429 is fluidly connected to the common pressure rail 442 by the pilot operated valve 440. Similar to previous embodiments, the electro-hydraulic motion control unit 422 can also include one way valves 460 for preventing cavitation within the hydraulic cylinder 424, and pressure relief valves 461 for preventing the hydraulic pressure within the hydraulic cylinder 424 from exceeding a predetermined pressure level.

In examples disclosed herein, as a source of hydraulic power directs hydraulic power thought a hydraulic pump/motor to a hydraulic actuator, an electric motor/generator coupled to the hydraulic pump/motor can be operated as a generator to tap energy from the pump/motor for storage (e.g., at a battery) or for use at another motion control unit. The electric motor/generator can also be operated as a motor to drive the hydraulic pump/motor as a pump to boost the power output of the pump/motor provided to the hydraulic actuator for driving movement of the hydraulic actuator. Thus, the source of hydraulic power and the electric motor/generator powered the electrical power source can together provide blended power to the hydraulic actuator. In certain examples, the source of hydraulic power can provide a first level of hydraulic power to drive the hydraulic actuator, and the electric motor/generator can be concurrently operated as a motor powered by the electrical power source to provide supplemental or boost hydraulic power to the hydraulic actuator as needed. It will be appreciated that the source of hydraulic power can provide high power density, and the electric motor/generator coupled t the electrical power source can provide power control flexibility. Thus, by using the source of hydraulic power and the electric motor/generator together to provide blended power the output of the hydraulic pump/motor can be precisely controlled without requiring the use of expensive pump control architectures. Additionally, by precisely controlling the hydraulic output of the hydraulic pump/motor by using blended power, the system can minimize or eliminate losses associated with throttling.

By providing both a source of hydraulic power and an electric motor/generator for providing blended power to the hydraulic actuator, it is possible for the electric motor/generator to be downsized as compared to if the electric motor/generator were required to satisfy the full power requirement of the hydraulic actuator. Reducing the overall size of the electric motor/generator makes the system more compatible with mobile applications such as off-road vehicles. For example, the dual power electro-hydraulic motion control units can be used to control the operation of the work circuits of off-road vehicles.

It will be appreciated that the dual power electro-hydraulic motion control units in accordance with the principles of the present disclosure can also be effectively used to recapture energy generated by a hydraulic actuator. For example, energy corresponding to an over-running condition at the hydraulic actuator can be recaptured by running a hydraulic pump/motor of the control unit as a motor while driving an electric motor/generator of the control unit as a generator such that the recaptured energy from the over-running condition can be stored as electric energy at a battery. Alternatively, during an over-running condition, hydraulic energy can be directed through the hydraulic pump/motor to the source of hydraulic power coupled to the pump/motor where the hydraulic energy can be stored hydraulically at a hydraulic accumulator. In certain examples, the output flow and pressure of the hydraulic pump/motor are controlled jointly between the hydraulic pressure of the source of hydraulic power and the shaft speed of the electric motor/generator. It will be appreciated that the pressure control dynamic of the source of hydraulic power can be relatively low, while the shaft speed control dynamics, which are a function of motor control, are relatively fast. Thus, the electric motor/generator can be used to dynamically control the output of the hydraulic pump/motor to enhance system responsiveness and precision.

What is claimed is:

1. A motion control device for powering a hydraulic actuator, the motion control device comprising:

a motion control unit adapted to be hydraulically connected to the hydraulic actuator, the motion control unit also being configured to be electrically connected to an electrical power source and fluidly connected to a hydraulic power source, the motion control unit including an electric motor/generator, a hydraulic pump/motor, and a mode-switching valve configured for allowing blended power from the electrical power source and the hydraulic power source to be transferred to the hydraulic actuator;

wherein the electric motor/generator is mechanically coupled to the hydraulic pump/motor, wherein the hydraulic pump/motor includes a first port and a second port, wherein when the mode-switching valve is in a first position the hydraulic power source fluidly connects to the second port, the first port fluidly connects, via the mode-switching valve, to a first side of the hydraulic actuator, and a second side of the hydraulic actuator fluidly connects, via the mode-switching valve, to a tank; wherein when the mode-switching valve is in a second position different from the first position the hydraulic power source fluidly connects to the second port, the first port fluidly connects, via the mode-switching valve, to the second side of the hydraulic actuator, and the first side of the hydraulic actuator fluidly connects, via the mode-switching valve, to the tank; and when the mode-switching valve is in a third position different from the first position and different from the second position the first port fluidly connects, via the mode-switching valve, to the second side of the hydraulic actuator, the second port fluidly connects, via the mode-switching valve, to the first side of the hydraulic actuator, and the hydraulic power source and the tank are isolated from the hydraulic actuator.

2. The motion control device of claim 1, wherein the electric motor/generator electrically connects to the electrical power source and is mechanically coupled to the hydraulic pump/motor.

3. The motion control device of claim 2, wherein the electric motor/generator is mechanically coupled to the hydraulic pump/motor by a drive shaft.

4. The motion control device of claim 1, wherein the mode-switching valve is positionable in the second position to fluidly connect, via the mode-switching valve, the first port of the hydraulic pump/motor to the second side of the hydraulic actuator.

5. The motion control device of claim 1, wherein the first side of the hydraulic actuator is a head side and the second side of the hydraulic actuator is a rod side.

* * * * *